(12) United States Patent
Ichioka et al.

(10) Patent No.: US 9,240,145 B2
(45) Date of Patent: Jan. 19, 2016

(54) MULTI-DISPLAY DEVICE AND IMAGE DISPLAY DEVICE

(75) Inventors: Hideki Ichioka, Osaka (JP); Takayuki Murai, Osaka (JP); Naoko Kondoh, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 127 days.

(21) Appl. No.: 14/113,629

(22) PCT Filed: Apr. 20, 2012

(86) PCT No.: PCT/JP2012/060721
§ 371 (c)(1),
(2), (4) Date: Oct. 24, 2013

(87) PCT Pub. No.: WO2012/147651
PCT Pub. Date: Nov. 1, 2012

(65) Prior Publication Data
US 2014/0043380 A1    Feb. 13, 2014

(30) Foreign Application Priority Data

Apr. 27, 2011  (JP) ................................. 2011-099896

(51) Int. Cl.
*G09G 3/34* (2006.01)
*H04N 5/57* (2006.01)
(Continued)

(52) U.S. Cl.
CPC ............ *G09G 3/3406* (2013.01); *G06F 3/1446* (2013.01); *G09G 3/3426* (2013.01); *H04N 5/57* (2013.01); *H04N 5/66* (2013.01); *H04N 21/42202* (2013.01); *H04N 21/4316* (2013.01);
(Continued)

(58) Field of Classification Search
CPC ..... G06F 3/1446; G06F 3/147; G06F 3/1423; G09G 3/3426; G09G 3/3406; G09G 2320/0233; G09G 3/36; G09G 3/3241; G09G 2356/00; G09G 2300/026; G09G 9/3026; G02F 1/133611
USPC ............................................ 345/1.1, 3.4, 690
See application file for complete search history.

(56) References Cited

U.S. PATENT DOCUMENTS

| 5,668,569 A * | 9/1997 | Greene et al. .................. 345/103 |
| 2006/0256035 A1* | 11/2006 | Kondo et al. .................. 345/1.1 |

(Continued)

FOREIGN PATENT DOCUMENTS

| JP | 2008-268246 A | 11/2008 |
| JP | 2009-042650 A | 2/2009 |
| JP | 2009-169196 A | 7/2009 |

OTHER PUBLICATIONS

Official Communication issued in International Patent Application No. PCT/JP2012/060721, mailed on May 29, 2012.

*Primary Examiner* — Premal Patel
(74) *Attorney, Agent, or Firm* — Keating & Bennett, LLP

(57) ABSTRACT

A multi-display device includes an image-display-light emitting backlight which includes a light emitting element arranged in each of a plurality of areas to emit light to form planar light; and a light emission controller configured or programmed to generate emission luminance data, for each of the areas, to drive the light emitting element. The light emission controller includes a luminance correcting controller configured or programmed to correct the emission luminance data on the basis of installation directions of image display devices and connection information that is information on connection positions thereof.

14 Claims, 22 Drawing Sheets

(51) Int. Cl.
*H04N 5/66* (2006.01)
*G06F 3/14* (2006.01)
*H04N 21/422* (2011.01)
*H04N 21/431* (2011.01)
*H04N 21/442* (2011.01)
*H04N 21/443* (2011.01)
*G09G 5/06* (2006.01)

(52) U.S. Cl.
CPC ....... *H04N 21/4318* (2013.01); *H04N 21/4436* (2013.01); *H04N 21/44218* (2013.01); *G09G 5/06* (2013.01); *G09G 2300/026* (2013.01); *G09G 2310/0232* (2013.01); *G09G 2320/0233* (2013.01); *G09G 2320/0238* (2013.01); *G09G 2320/064* (2013.01); *G09G 2320/0666* (2013.01); *G09G 2320/08* (2013.01); *G09G 2356/00* (2013.01)

(56) References Cited

U.S. PATENT DOCUMENTS

| | | | |
|---|---|---|---|
| 2008/0278432 A1 | 11/2008 | Ohshima | |
| 2008/0284947 A1* | 11/2008 | Li et al. | 349/73 |
| 2009/0009456 A1 | 1/2009 | Ohshima | |
| 2010/0296026 A1* | 11/2010 | Kubota et al. | 349/62 |

* cited by examiner

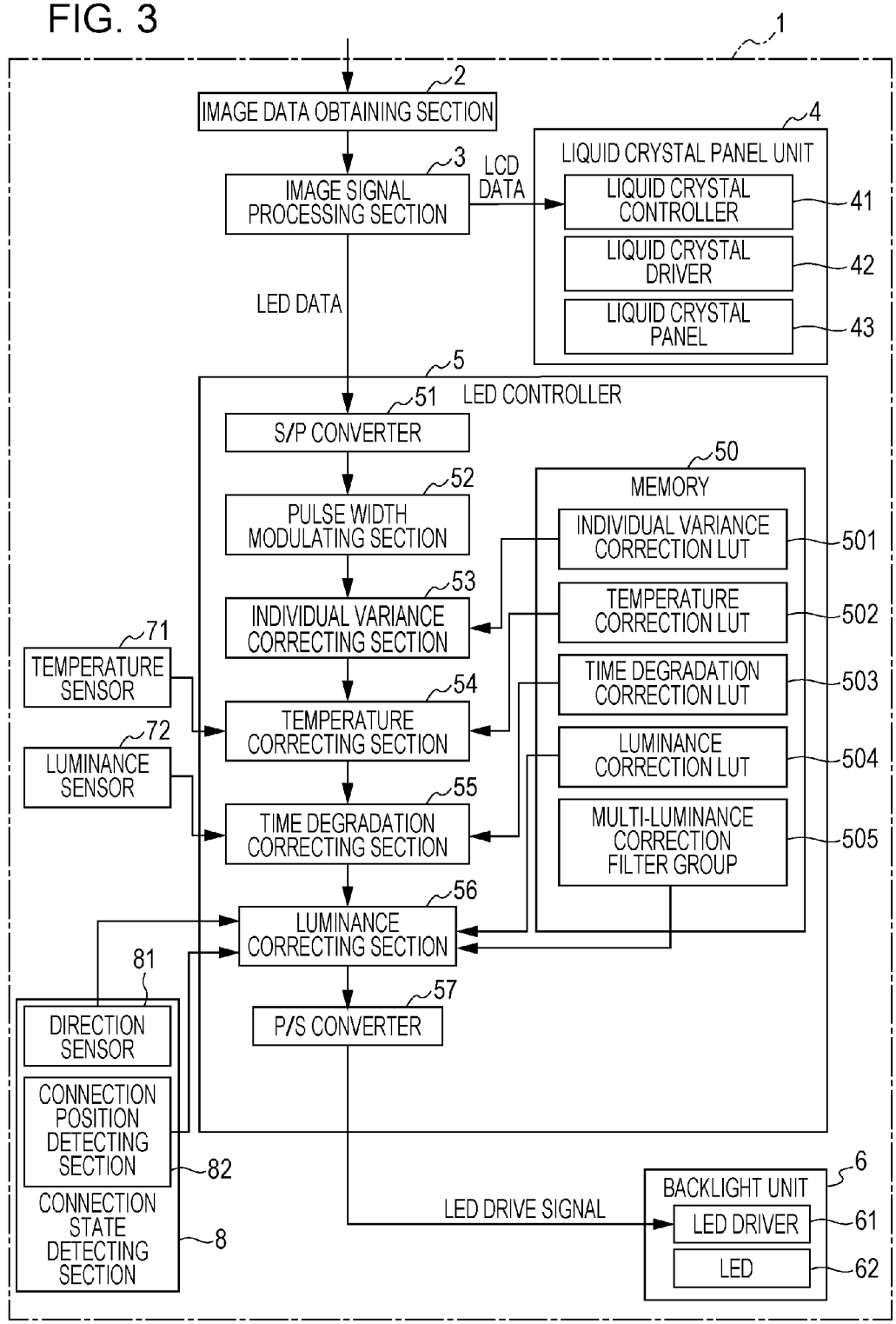

FIG. 5A

| 200 | 200 | 200 | 200 | 200 | 200 | 200 | 200 | 200 | 200 | 200 | 200 | 200 | 200 | 200 | 200 |
|---|---|---|---|---|---|---|---|---|---|---|---|---|---|---|---|
| 200 | 232 | 232 | 232 | 232 | 232 | 232 | 232 | 232 | 232 | 232 | 232 | 232 | 232 | 232 | 200 |
| 200 | 232 | 245 | 245 | 245 | 245 | 245 | 245 | 245 | 245 | 245 | 245 | 245 | 245 | 232 | 200 |
| 200 | 232 | 245 | 255 | 255 | 255 | 255 | 255 | 255 | 255 | 255 | 255 | 255 | 245 | 232 | 200 |
| 200 | 232 | 245 | 255 | 255 | 255 | 255 | 255 | 255 | 255 | 255 | 255 | 255 | 245 | 232 | 200 |
| 200 | 232 | 245 | 255 | 255 | 255 | 255 | 255 | 255 | 255 | 255 | 255 | 255 | 245 | 232 | 200 |
| 200 | 232 | 245 | 245 | 245 | 245 | 245 | 245 | 245 | 245 | 245 | 245 | 245 | 245 | 232 | 200 |
| 200 | 232 | 232 | 232 | 232 | 232 | 232 | 232 | 232 | 232 | 232 | 232 | 232 | 232 | 232 | 200 |
| 200 | 200 | 200 | 200 | 200 | 200 | 200 | 200 | 200 | 200 | 200 | 200 | 200 | 200 | 200 | 200 |

FIG. 5B

PWM VALUE AFTER CORRECTION

| 3212 | 3212 | 3212 | 3212 | 3212 | 3212 | 3212 | 3212 | 3212 | 3212 | 3212 | 3212 | 3212 | 3212 | 3212 | 3212 |
|---|---|---|---|---|---|---|---|---|---|---|---|---|---|---|---|
| 3212 | 3726 | 3726 | 3726 | 3726 | 3726 | 3726 | 3726 | 3726 | 3726 | 3726 | 3726 | 3726 | 3726 | 3726 | 3212 |
| 3212 | 3726 | 3934 | 3934 | 3934 | 3934 | 3934 | 3934 | 3934 | 3934 | 3934 | 3934 | 3934 | 3934 | 3726 | 3212 |
| 3212 | 3726 | 3934 | 4095 | 4095 | 4095 | 4095 | 4095 | 4095 | 4095 | 4095 | 4095 | 4095 | 3934 | 3726 | 3212 |
| 3212 | 3726 | 3934 | 4095 | 4095 | 4095 | 4095 | 4095 | 4095 | 4095 | 4095 | 4095 | 4095 | 3934 | 3726 | 3212 |
| 3212 | 3726 | 3934 | 4095 | 4095 | 4095 | 4095 | 4095 | 4095 | 4095 | 4095 | 4095 | 4095 | 3934 | 3726 | 3212 |
| 3212 | 3726 | 3934 | 3934 | 3934 | 3934 | 3934 | 3934 | 3934 | 3934 | 3934 | 3934 | 3934 | 3934 | 3726 | 3212 |
| 3212 | 3726 | 3726 | 3726 | 3726 | 3726 | 3726 | 3726 | 3726 | 3726 | 3726 | 3726 | 3726 | 3726 | 3726 | 3212 |
| 3212 | 3212 | 3212 | 3212 | 3212 | 3212 | 3212 | 3212 | 3212 | 3212 | 3212 | 3212 | 3212 | 3212 | 3212 | 3212 |

FIG. 7A

| 200 | 200 | 200 | 200 | 200 | 200 | 200 | 200 | 200 | 200 | 200 | 200 | 200 | 200 | 200 | 200 |
|---|---|---|---|---|---|---|---|---|---|---|---|---|---|---|---|
| 200 | 232 | 232 | 232 | 232 | 232 | 232 | 200 | 200 | 200 | 232 | 232 | 232 | 232 | 232 | 232 |
| 200 | 232 | 245 | 245 | 245 | 245 | 245 | 245 | 245 | 245 | 245 | 245 | 245 | 245 | 245 | 245 |
| 200 | 232 | 245 | 255 | 255 | 255 | 255 | 255 | 255 | 255 | 255 | 255 | 255 | 255 | 255 | 255 |
| 200 | 232 | 245 | 255 | 255 | 255 | 255 | 255 | 255 | 255 | 255 | 255 | 255 | 255 | 255 | 255 |
| 200 | 232 | 245 | 255 | 255 | 255 | 255 | 255 | 255 | 255 | 255 | 255 | 255 | 255 | 255 | 255 |
| 200 | 232 | 245 | 255 | 255 | 255 | 255 | 255 | 255 | 255 | 255 | 255 | 255 | 255 | 255 | 255 |
| 200 | 232 | 245 | 255 | 255 | 255 | 255 | 255 | 255 | 255 | 255 | 255 | 255 | 255 | 255 | 255 |
| 200 | 232 | 245 | 255 | 255 | 255 | 255 | 255 | 255 | 255 | 255 | 255 | 255 | 255 | 255 | 255 |

PWM VALUE AFTER CORRECTION

| 3212 | 3212 | 3212 | 3212 | 3212 | 3212 | 3212 | 3212 | 3212 | 3212 | 3212 | 3212 | 3212 | 3212 | 3212 | 3212 |
|---|---|---|---|---|---|---|---|---|---|---|---|---|---|---|---|
| 3212 | 3726 | 3726 | 3726 | 3726 | 3726 | 3726 | 3726 | 3726 | 3726 | 3726 | 3726 | 3726 | 3726 | 3726 | 3726 |
| 3212 | 3726 | 3934 | 3934 | 3934 | 3934 | 3934 | 3934 | 3934 | 3934 | 3934 | 3934 | 3934 | 3934 | 3934 | 3934 |
| 3212 | 3726 | 3934 | 4095 | 4095 | 4095 | 4095 | 4095 | 4095 | 4095 | 4095 | 4095 | 4095 | 4095 | 4095 | 4095 |
| 3212 | 3726 | 3934 | 4095 | 4095 | 4095 | 4095 | 4095 | 4095 | 4095 | 4095 | 4095 | 4095 | 4095 | 4095 | 4095 |
| 3212 | 3726 | 3934 | 4095 | 4095 | 4095 | 4095 | 4095 | 4095 | 4095 | 4095 | 4095 | 4095 | 4095 | 4095 | 4095 |
| 3212 | 3726 | 3934 | 4095 | 4095 | 4095 | 4095 | 4095 | 4095 | 4095 | 4095 | 4095 | 4095 | 4095 | 4095 | 4095 |
| 3212 | 3726 | 3934 | 4095 | 4095 | 4095 | 4095 | 4095 | 4095 | 4095 | 4095 | 4095 | 4095 | 4095 | 4095 | 4095 |
| 3212 | 3726 | 3934 | 4095 | 4095 | 4095 | 4095 | 4095 | 4095 | 4095 | 4095 | 4095 | 4095 | 4095 | 4095 | 4095 |

|  |  |  |  |  | 600 | 5052 |  |  |  |  |  |  |  |  |
|---|---|---|---|---|---|---|---|---|---|---|---|---|---|---|
| 200 | 200 | 200 | 200 | 200 | 200 | 200 | 200 | 200 | 200 | 200 | 200 | 200 | 200 | 200 |
| 232 | 232 | 232 | 232 | 232 | 232 | 232 | 232 | 232 | 232 | 232 | 232 | 232 | 232 | 232 |
| 245 | 245 | 245 | 245 | 245 | 245 | 245 | 245 | 245 | 245 | 245 | 245 | 245 | 245 | 245 |
| 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 |

FIG. 8B

PWM VALUE AFTER CORRECTION

|  |  |  |  |  | 600 |  |  |  |  |  |  |  |  |  |
|---|---|---|---|---|---|---|---|---|---|---|---|---|---|---|
| 3212 | 3212 | 3212 | 3212 | 3212 | 3212 | 3212 | 3212 | 3212 | 3212 | 3212 | 3212 | 3212 | 3212 | 3212 |
| 3726 | 3726 | 3726 | 3726 | 3726 | 3726 | 3726 | 3726 | 3726 | 3726 | 3726 | 3726 | 3726 | 3726 | 3726 |
| 3934 | 3934 | 3934 | 3934 | 3934 | 3934 | 3934 | 3934 | 3934 | 3934 | 3934 | 3934 | 3934 | 3934 | 3934 |
| 4095 | 4095 | 4095 | 4095 | 4095 | 4095 | 4095 | 4095 | 4095 | 4095 | 4095 | 4095 | 4095 | 4095 | 4095 |
| 4095 | 4095 | 4095 | 4095 | 4095 | 4095 | 4095 | 4095 | 4095 | 4095 | 4095 | 4095 | 4095 | 4095 | 4095 |
| 4095 | 4095 | 4095 | 4095 | 4095 | 4095 | 4095 | 4095 | 4095 | 4095 | 4095 | 4095 | 4095 | 4095 | 4095 |
| 4095 | 4095 | 4095 | 4095 | 4095 | 4095 | 4095 | 4095 | 4095 | 4095 | 4095 | 4095 | 4095 | 4095 | 4095 |
| 4095 | 4095 | 4095 | 4095 | 4095 | 4095 | 4095 | 4095 | 4095 | 4095 | 4095 | 4095 | 4095 | 4095 | 4095 |
| 4095 | 4095 | 4095 | 4095 | 4095 | 4095 | 4095 | 4095 | 4095 | 4095 | 4095 | 4095 | 4095 | 4095 | 4095 |

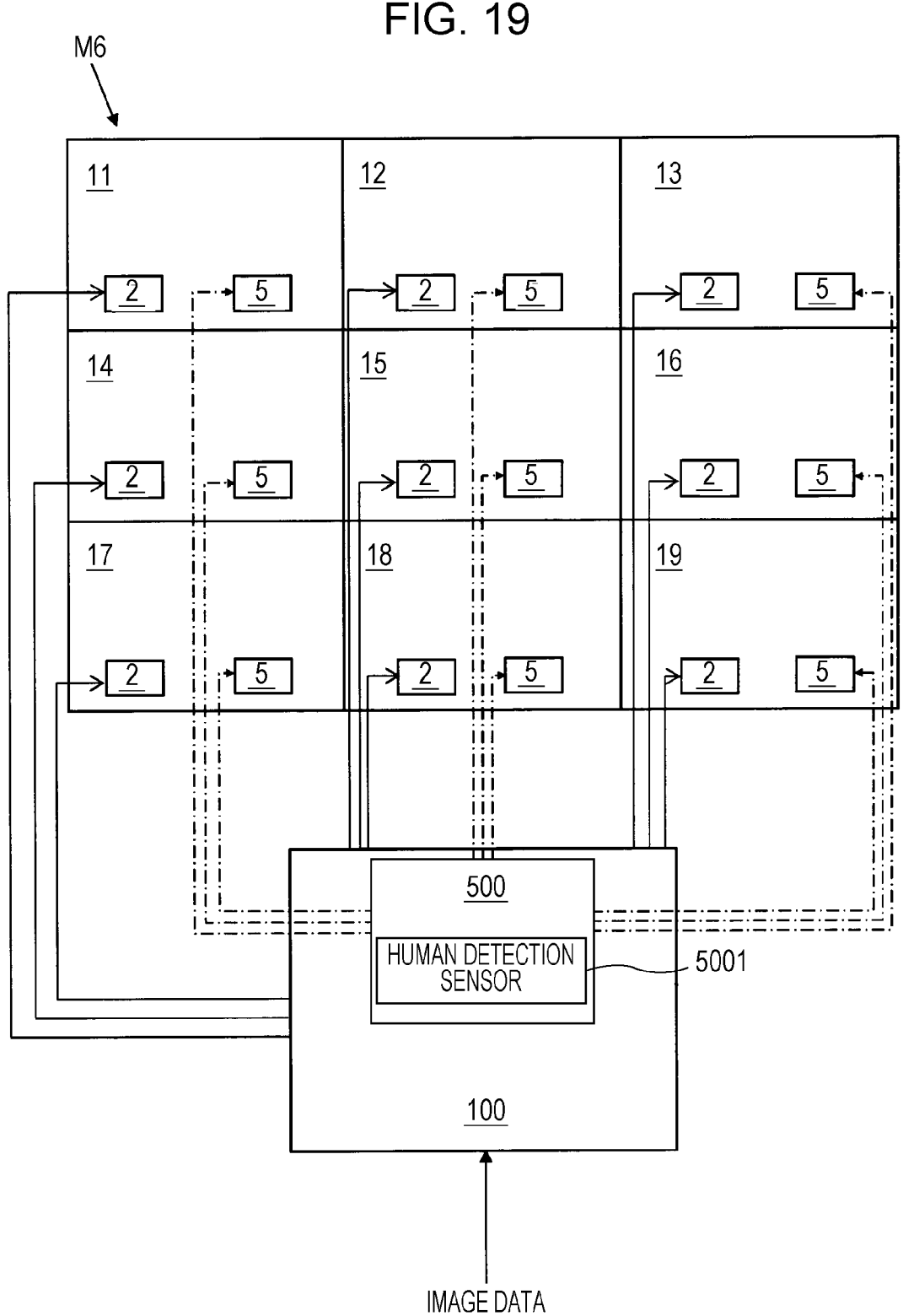

FIG. 23

| | | | | | | | 600 | | 5091(509) | | | | | |
|---|---|---|---|---|---|---|---|---|---|---|---|---|---|---|
| 0 | 0 | 0 | 0 | 0 | 0 | 0 | 200 | 200 | 200 | 200 | 200 | 200 | 200 | 200 |
| 0 | 0 | 0 | 0 | 0 | 0 | 0 | 200 | 232 | 232 | 232 | 232 | 232 | 232 | 232 |
| 0 | 0 | 0 | 0 | 0 | 0 | 0 | 200 | 232 | 245 | 245 | 245 | 245 | 245 | 245 |
| 0 | 0 | 0 | 0 | 0 | 0 | 0 | 200 | 232 | 245 | 255 | 255 | 255 | 255 | 255 |
| 0 | 0 | 0 | 0 | 0 | 0 | 0 | 200 | 232 | 245 | 255 | 255 | 255 | 255 | 255 |
| 0 | 0 | 0 | 0 | 0 | 0 | 0 | 200 | 232 | 245 | 255 | 255 | 255 | 255 | 255 |
| 0 | 0 | 0 | 0 | 0 | 0 | 0 | 200 | 232 | 245 | 255 | 255 | 255 | 255 | 255 |
| 0 | 0 | 0 | 0 | 0 | 0 | 0 | 200 | 232 | 245 | 255 | 255 | 255 | 255 | 255 |
| 0 | 0 | 0 | 0 | 0 | 0 | 0 | 200 | 232 | 245 | 255 | 255 | 255 | 255 | 255 |

MULTI-DISPLAY DEVICE AND IMAGE DISPLAY DEVICE

TECHNICAL FIELD

The present invention relates to a multi-display device in which a plurality of image display devices are arranged, and an image display device that constitutes the multi-display device.

BACKGROUND ART

In recent years, in a place where a lot of people gather, such as an event site, a station, or an airport, a multi-display device in which a plurality of liquid crystal displays are arranged vertically or horizontally, or vertically and horizontally has been installed to display a large amount of information. In the multi-display device, the liquid crystal displays display images corresponding to their installation places to display a large-screen image.

A typical multi-display device employs liquid crystal displays having the same luminance of images, but in practice, the luminance of images for the liquid crystal displays may vary due to individual differences which cause luminance unevenness. In such a multi-display device, if variance occurs in the luminance of images displayed on the respective liquid crystal displays, continuity between the images is deteriorated, which may cause inconvenience to an observer.

In order to suppress such luminance unevenness, Japanese Unexamined Patent Application Publication No. 2009-169196 discloses a technique in which a backlight unit for forming images in a plurality of image display sections includes a plurality of light sources and the brightness of the light sources of the backlight unit is controlled to suppress the occurrence of luminance unevenness.

Further, as a liquid crystal display that constitutes the multi-display device, there is a device in which an image display region is divided into a plurality of areas (regions) and a backlight unit that controls, for each area, light emission of a light emitting element provided in each area (which may be hereinafter referred to as an "area-drive backlight unit") is used. In the liquid crystal display provided with such an area-drive backlight unit, the brightness of the backlight is adjusted in accordance with an image displayed in the image display region.

Further, in the area-drive backlight unit, control is performed for decreasing the luminance of light emitting elements in areas corresponding to a peripheral part of the image display region to a degree that an observer cannot recognize decrease in the brightness. By performing such control, it is possible to reduce power consumption without the observer recognizing decrease in contrast.

CITATION LIST

Patent Literature

PTL 1: Japanese Unexamined Patent Application Publication No. 2009-169196

SUMMARY OF INVENTION

Technical Problem

However, in the technique disclosed in Japanese Unexamined Patent Application Publication No. 2009-169196, the arrangement and number of the image display sections are determined in advance, and thus, it is difficult to change the arrangement and number or to change the direction of the image display section in arrangement, which has low versatility.

Further, in the liquid crystal display provided with the area-drive backlight unit, control is performed to suppress the luminance at a peripheral part in each liquid crystal display. In a case where the liquid crystal display is used as a single body, the luminance suppressed part corresponds to the peripheral part, but in a multi-display device in which the plurality of liquid crystal displays are arranged, the luminance suppressed part may be displayed at a central part of an image display region of the multi-display device. In this case, an image displayed in the multi-display device may have luminance unevenness that may be recognized by an observer, which reduces image display quality.

In the above description, a case where the image-display-light emitting device is the backlight is described as an example, but it is considered that similar problems occur in various devices of the area-drive type in which control is performed to suppress total light emission power of the image-display-light emitting device on the basis of a displayed image.

Accordingly, an object of the present invention is to provide a multi-display device in which a plurality of image display devices are arranged, capable of providing high-quality image display with low power consumption without degradation of display quality. Further, another object of the present invention is to provide an image display device that constitutes such a multi-display device.

Solution to Problem

The present invention provides a multi-display device in which a plurality of image display devices are arranged to display a continuous image, each of the image display devices including: image-display-light emitting means for causing a light emitting element arranged in each of a plurality of areas to emit light to form planar light; and light emission control means for generating emission luminance data, for each area, for driving the light emitting element, in which the light emission control means includes luminance correcting means for correcting the emission luminance data on the basis of connection information on the image display device.

With this configuration, using the image-display-light emitting means capable of emitting planar light of which the luminance is adjusted for each area, it is possible to form an image displayed in the multi-display device to have luminance in consideration of perceptual features of human vision, and to reduce the luminance of a part of the planar light while reducing a possibility of luminance unevenness being recognized by an observer. Thus, it is possible to reduce power consumption without degradation of display quality.

The connection information may at least include information about any one of the number of connections, an installation direction, and a connection position.

In the above configuration, the luminance correcting means may correct the emission luminance data so that the planar light emitted from the image-display-light emitting means included in each of the image display devices is controlled to have a decreased luminance in a peripheral part of an image display section of the multi-display device.

In the above configuration, the luminance correcting means may correct the emission luminance data so that the planar light has a uniform luminance distribution and thereafter perform luminance correction on the basis of the connection information. Here, the image display device may include image-display-light emitting means for forming planar light with a non-uniform luminance distribution.

In the above configuration, the light emission control means may include a multi-luminance correction filter group including a correction data table for correction of the emission luminance data on each of the plurality of image display devices, and the luminance correcting means may correct the emission luminance data with reference to the correction data table selected from the multi-luminance correction filter group on the basis of the connection information.

In the above configuration, the light emission control means may include luminance inclination information along at least two directions of the multi-display device, the light emission control means may include calculating means for generating a multi-luminance correction filter group corresponding to each image display device on the basis of the luminance inclination information, and the luminance correcting means may correct the emission luminance data with reference to the correction data table selected from the multi-luminance correction filter group on the basis of the connection information.

In the above configuration, connection state detecting means that includes direction detecting means for detecting an installation direction of the image display device and/or connection position detecting means for detecting a connection position of the image display device in the multi-display device may be provided.

In the above configuration, the multi-display device may include external control means that is connected to all of the plurality of image display devices, that detects the installation direction and the connection position of each of the image display devices, and that transmits the connection information to the luminance correcting means.

In the above configuration, the multi-display device may include external control means that is connected to all of the plurality of image display devices, that detects the installation direction and the connection position of each of the image display devices, and that transmits the connection information to the luminance correcting means, and the connection information may be information for selection of the corresponding correction data table from the multi-luminance correction filter group.

In the above configuration, the multi-display device may include external control means that is connected to all of the plurality of image display devices, that detects the installation direction and the connection position of each of the image display devices, and that transmits the connection information to the luminance correcting means, and the external control means may include external control means including a multi-luminance correction filter group including a correction data table for correction of the emission luminance data on each of the plurality of image display devices, and the connection information may be a correction data table selected from the multi-luminance correction filter group on the basis of the installation direction and the connection position of the image display device.

In the above configuration, the multi-display device may include external control means that is connected to all of the plurality of image display devices, that detects the installation direction and the connection position of each of the image display devices, and that transmits the connection information to the luminance correcting means. The external control means may include luminance inclination information along at least two directions of the multi-display device, the external control means may include calculating means for generating a multi-luminance correction filter group corresponding to each of the image display devices on the basis of the luminance inclination information, and the connection information may be a correction data table selected from the multi-luminance correction filter group on the basis of the installation direction and the connection position of the image display device.

In the above configuration, the multi-display device may include detecting means for detecting the position of an observer, and the multi-luminance correction filter group may include a correction data table for correcting the emission luminance data on each of the image display devices in accordance with the position of the observer.

Advantageous Effects of Invention

According to the present invention, by controlling the image-display-light emitting means of each of the plurality of image display devices to emit planar light with optimal luminance distribution in accordance with the arrangement, direction, and number thereof, it is possible to provide a multi-display device capable of providing high-quality image display with low power consumption without degradation of display quality. Further, it is possible to provide an image display device that constitutes such a multi-display device.

BRIEF DESCRIPTION OF DRAWINGS

FIG. 3 is a block diagram illustrating a configuration of the liquid crystal display shown in FIG. 2.

FIG. 5A is a diagram illustrating an example of a luminance correction LUT that performs luminance correction.

FIG. 5B is a diagram illustrating PWM values in a partial area corrected by the luminance correction LUT in FIG. 5A.

FIG. 7A is a diagram illustrating a part of a multi-luminance correction filter group.

FIG. 7B is a diagram illustrating PWM values corrected by the multi-luminance correction filter group shown in FIG. 7A.

FIG. 8A is a diagram illustrating a table of a part different from the part shown in FIG. 7A.

FIG. 8B is a diagram illustrating PWM values corrected by the table in FIG. 8A.

FIG. 19 is a diagram illustrating an overall configuration of still another example of a multi-display device according to an embodiment of the present invention.

FIG. 23 is a diagram illustrating an example of a table provided in a multi-luminance correction filter group provided in the liquid crystal display shown in FIG. 22.

DESCRIPTION OF EMBODIMENTS

Hereinafter, embodiments of the present invention will be described with reference to the accompanying drawings.

First Embodiment

Configuration of Multi-Display Device

Figure 1:
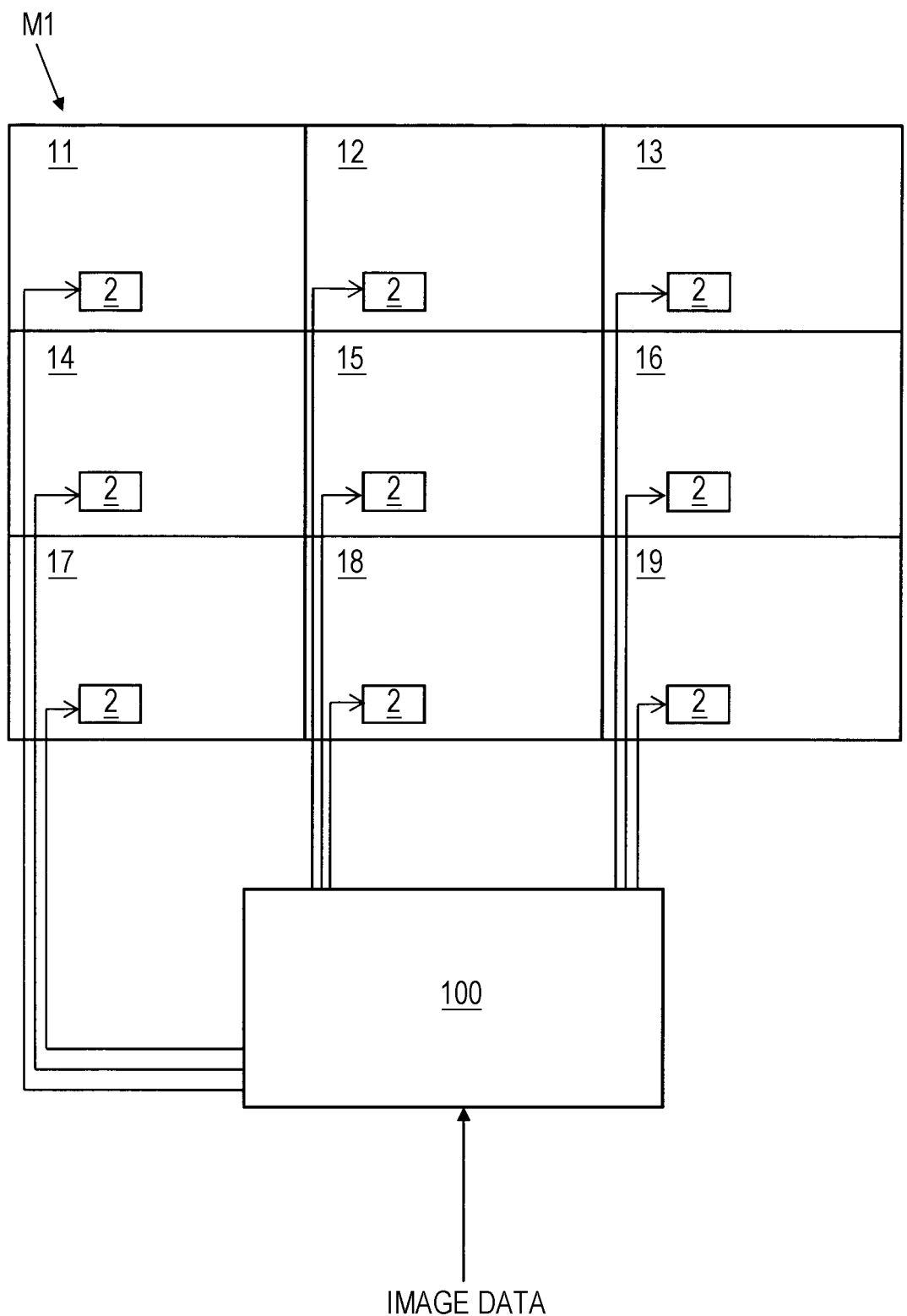
FIG. 1 is a diagram illustrating an overall configuration of a multi-display device according to an embodiment of the present invention.

FIG. 1 is a diagram illustrating an overall configuration of an example of a multi-display device according to an embodiment of the present invention. As shown in FIG. 1, a multi-display device M1 includes nine liquid crystal displays 11 to 19 and an image distributer 100. As shown in FIG. 1, in the multi-display device M1, nine liquid crystal displays are arranged in horizontal orientation in the form of 3 (width)×3 (height).

The image distributer 100 is connected to each of the nine liquid crystal displays 11 to 19. The image distributor 100 divides image data on an image corresponding to one screen transmitted from an optical disc device such as a DVD device or a BD device, a personal computer, or the like into data on nine images to be displayed in the nine liquid crystal displays 11 to 19, and outputs image data corresponding to each screen to the liquid crystal displays 11 to 19. Further, the image distributor 100 may also transmit the image data corresponding to one screen to each of the liquid crystal displays 11 to 19 without division as necessary. Further, the image distributor 100 may also transmit different nine images to the respective liquid crystal displays 11 to 19. Detailed description about the image distributor 100 is omitted since it is well known in the related art. In FIG. 1, a solid-lined arrow extending to each of the liquid crystal displays 11 to 19 from the image distributor 100 indicates the flow of image data.

As shown in FIG. 1, the liquid crystal displays 11 to 19 are arranged vertically and horizontally in the form of 3×3 such that image display surfaces thereof are arranged on the same plane, to thereby form one screen. The liquid crystal displays 11 to 19 have the same size and configuration, and the screen formed by the arrangement of the liquid crystal displays 11 to 19 has the same aspect ratio as that of one liquid crystal display (for example, the liquid crystal display 11) and a size corresponding to nine times (about 9 times) that of one liquid crystal display. Further, an image data obtaining section 2 is provided in each of the liquid crystal displays 11 to 19, which will be described later.

(Configuration of Liquid Crystal Display)

Figure 2:
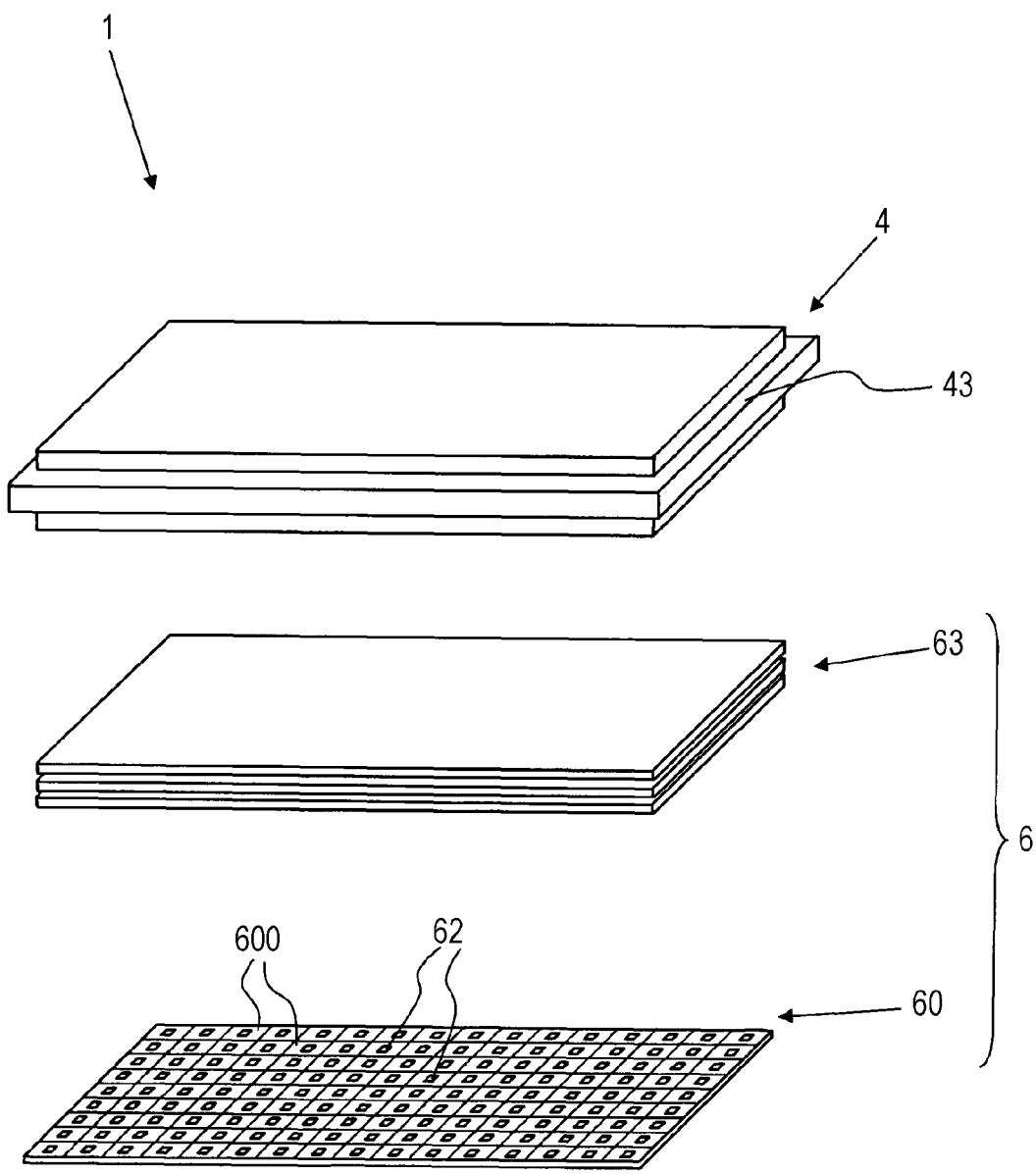
FIG. 2 is an exploded perspective view of a liquid crystal display.

Next, details about the liquid crystal displays 11 to 19 that constitute the multi-display device M1 will be described with reference to the accompanying drawings. Since the liquid crystal displays 11 to 19 have the same configuration, the liquid crystal display 11 will be referred to as a liquid crystal display 1 as a representative, and its configuration will be described. FIG. 2 is an exploded perspective view of a liquid crystal display, and FIG. 3 is a block diagram illustrating a configuration of the liquid crystal display shown in FIG. 2.

As shown in FIGS. 2 and 3, the liquid crystal display 1 includes the image data obtaining section 2, an image signal processing section 3, a liquid crystal panel unit 4, an LED controller 5 (light emission control means), a backlight unit 6 (image-display-light emitting means), a temperature sensor 71, a luminance sensor 72, a connection state detecting section 8 (state detecting means), and the like. As shown in FIG. 2, the liquid crystal display 1 forms a horizontal rectangle as a whole, and is integrally retained by a bezel or the like that forms a frame.

Hereinafter, the liquid crystal display 1 will be described in detail. As shown in FIG. 3, the image data obtaining section 2 includes an external input interface that obtains image data transmitted from the image distributor 100. The image data obtaining section 2 transmits the obtained image data (image signal) to the image signal processing section 3. The image data is data that specifies luminance or the like of each pixel for each frame and specifies the content of a moving image (or a still image).

The image signal processing section 3 receives the image data from the image data obtaining section 2, and generates LCD data that is data on light transmittance of each pixel and LED data indicating luminance of emission light from an LED 62 (to be described later) of the backlight unit 6 on the basis of the image data. Further, the LCD data is transmitted to the liquid crystal panel unit 4, and the LED data is transmitted to the LED controller 5, respectively.

As shown in FIG. 2, the liquid crystal panel unit 4 includes a liquid crystal controller 41, a liquid crystal driver 42, and a liquid crystal panel 43. The liquid crystal panel 43 has a rectangular shape in a plan view, and has a configuration in which a pair of glass substrates is bonded with a predetermined gap and liquid crystal is sealed between the glass substrates.

A switching element (for example, a TFT (thin film transistor)) connected to a source wire and a gate wire that are orthogonal to each other, a pixel electrode connected to the switching element, an orientation film, and the like are provided on one glass substrate; and a color filter in which respective coloring sections of R (red), G (green), B (blue), and the like are arranged with a predetermined array, a common electrode, an orientation film, and the like are provided on the other glass substrate. A polarizer is further disposed outside the both substrates.

With such a configuration, the liquid crystal panel unit 4 is formed with color pixels with 1920×1080 dots for high definition display, for example.

The liquid crystal panel unit 4 will be further described. The liquid crystal controller 41 generates a signal for driving the liquid crystal driver 42 on the basis of the LCD data transmitted from the image signal processing section 3, and transmits the result to the liquid crystal driver 42. The liquid crystal driver 42 switches the state of the switching element of each pixel of the liquid crystal panel 43 on the basis of the signal received from the liquid crystal controller 41.

Thus, voltage of each pixel electrode provided in the liquid crystal panel 43 is adjusted according to image data, the liquid crystal disposed in each pixel is driven, and the light transmittance in each pixel is adjusted. In the liquid crystal display 1, as planar light from the backlight unit 6 is incident from a rear surface of the liquid crystal panel unit 4, an image is displayed in an image display region of the liquid crystal panel 43.

The backlight unit 6 is driven by an LED control signal generated in the LED controller 5, and emits planar light to the liquid crystal panel unit 4. The backlight unit 6 includes an LED mounted board (LED panel) 60, an LED driver 61, a light emitting diode (LED) 62, an optical member 63 such as a diffuser or an optical sheet, and the like. In the backlight unit 6, the LED panel 60 is mounted with the LEDs 62 on a mounting surface thereof that faces the liquid crystal panel unit 4.

The LED panel 60 has a configuration in which a plurality of areas 600 are arranged vertically and horizontally. Further, the areas 600 are set so that at least one LED 62 is included in each of the areas 600. As shown in FIG. 2, in the backlight unit 6, the LED panel 60 includes 16 (width)×9 (height) (total 144) areas 600. The LED driver 61 drives (for light emission) the LED 62 on the basis of the LED control signal (to be described later) from the LED controller 5 for each of the areas 600. LED data and a PWM value (emission luminance data details of which will be described later) generated on the basis of the LED data are given to each of the areas 600.

The LED 62 forms an LED unit including LED chips that emit beams of wavelengths of R, G and B as a set. The LED unit forms a white beam as a whole by emission of the beams of the respective wavelengths. Further, the configuration (type, color, combination, and the like) of the LED 62 may be replaced with different configurations. For example, a white LED such as a pseudo white LED or a high color rendering white LED may be used instead of the above-mentioned LED unit, or an LED unit in which an LED that emits a beam of a wavelength of yellow (Y) is added to the above-mentioned R, G and B LEDs as a set may be used.

Since the luminance of the LED 62 is determined according to electric current that is supplied thereto (supply current) and the light emitting luminance and the supplied current of the LED 62 are approximately proportional to each other, the LED data indicating the luminance of the LED 62 represents data indicating a value of the supply current to each LED 62. Further, the supply current to the LED 62 is controlled by PWM (pulse width modulation) control, and the LED controller 5 generates a duty ratio (hereinafter, referred to as a PWM value) used for the PWM control based on the LED data. The LED data employs a format of a digital signal of 12 bits, for example. In the following description, it is assumed that the PWM value is also represented as 12 bits (0 to 4095).

As described above, the backlight unit 6 may adjust the luminance of the LED 62 mounted on the LED panel 60 for each of the areas 600. That is, the backlight unit 6 is a backlight unit of a so-called area active type, capable of emitting planar light (with luminance distribution) in which the luminance is adjusted for each of the areas 600 to a region corresponding to the area 600 of the liquid crystal panel unit 4.

As described above, the LED controller 5 generates the LED control signal for controlling the driving of the backlight unit 6 on the basis of the LED data. The LED data may include luminance information (APL value) on an image included in the image data. When the APL value is included in the LED data, the LED controller 5 may generate the LED control signal that reflects the luminance information on the image data. The LED control signal includes a PWM signal indicating the PWM value for control of light emission of the LED 62.

The LED controller 5 includes a serial-to-parallel converter (S/P converter) 51, a pulse width modulating section 52, an individual variance correcting section 53, a temperature correcting section 54, a time degradation correcting section 55, a luminance correcting section 56 (luminance correcting means), a parallel-to-serial converter (P/S converter) 57, and a memory 50.

The S/P converter 51 converts the LED data that is serial data transmitted from the image signal processing section 3 into parallel data. The pulse width modulating section 52 generates a PWM value on the basis of the LED data.

The individual variance correcting section 53 confirms individual performance of the LED 62 in advance, and corrects the PWM value for removing the individual differences. More specifically, the PWM value is set so that, when each LED chip that constitutes the LED 62 is lighted with a predetermined PWM value, the LED 62 obtains white light having a desired tone. Then, the plurality of LEDs 62 are lighted, and the PWM value is corrected for each of the areas 600 so as to remove luminance unevenness as planar light. By performing the correction as described above, the PWM values are generated in which an individual difference (individual variance of luminance and luminance unevenness of planar light) of the LEDs 62 is corrected.

There are various methods for the above-described correction process, but a correction process that uses a typical lookup table (LUT) may be employed. That is, the individual variance correcting section 53 performs the correction process with reference to an individual variance correction LUT 501 stored in the memory 50.

The memory 50 stores various lookup tables (the individual variance correction LUT 501, a temperature correction LUT 502, a time degradation correction LUT 503, and a luminance correction LUT 504) used in the correcting sections (the individual variance correcting section 53, the temperature correcting section 54, the time degradation correcting section 55, and the luminance correcting section 56) included in the LED controller 5. Each LUT is referred to as necessary.

The temperature correcting section 54 corrects luminance degradation of the LED 62 due to temperature increase according to light emission of the LED 62. For example, the temperature correcting section 53 receives a temperature measurement result of the LED 62 as temperature data from the temperature sensor 71. The temperature correcting section 53 corrects the PWM value with respect to the LED 62 of each of the areas 600 with reference to the temperature correction LUT 502 on the basis of the temperature data. Thus, the luminance degradation of the LED 62 due to temperature is corrected. The temperature data may be obtained at a predetermined frequency (for example, one time per second).

The time degradation correcting section 55 corrects the luminance degradation of the LED 62 due to time degradation of the LED 62. For example, the time degradation correcting section 62, when cumulative lighting time reaches a predetermined time (for example, 5000 hours), obtains the luminance data on the LED 62 by the luminance sensor 72. The time degradation correcting section 55 corrects the luminance, that is, the PWM value with respect to each LED 62 on the basis of the luminance data with reference to the time degradation correction LUT 503 of the memory 50.

Human eyes have a perceptual feature of recognizing, in a case where the luminance is sufficiently high at a central part of an image display section, the planar light from the backlight unit 6 as planar light with uniform luminance that does not include luminance unevenness even though the luminance at a peripheral part of the image display section is low. Considering such a perceptual feature, the luminance correcting section 56 corrects the PWM value so that the luminance at the peripheral part of the planar light from the backlight unit 6 is decreased to a degree that the human eyes cannot distinguish the luminance at the peripheral part from the luminance at the central part. By reducing the luminance at the peripheral part of the planar light in this manner, it is possible to reduce power consumption of the LED 62 without reduction in image display quality (without recognizing luminance unevenness).

In this correction, the PWM value for driving the LED 62 for each of the areas 600 is corrected with reference to the luminance correction LUT 504 provided in the memory 50, for example. In a case where the liquid crystal display 1 is used as a single body, the correction is performed with reference to the luminance correction LUT 504 including correction information corresponding to the areas 600 with an arrangement of 16 (width)×9 (height) (144).

In a case where the liquid crystal display 1 is used as a part of the multi-display device M1, the luminance correcting section 56 performs the correction on the basis of the information from the connection state detecting section 8 that is separately provided. The connection state detecting section 8 includes a direction sensor 81 (direction detecting means) that detects an installation direction (for example, horizontally oriented or vertically oriented) of the liquid crystal display 1, and a connection position detecting section 82 (connection position detecting means) that detects the position where the liquid crystal display 11 is provided in the multi-display device M1. The connection state detecting section 8 transmits connection information including information on the connection position and direction of the liquid crystal display 1 in the multi-display device M1 to the luminance correcting section 56. The connection information may include additional information such as the number of the liquid crystal displays that constitute the multi-display device M1, in addition to the information on the position and direction.

Further, the memory 50 stores a multi-luminance correction filter group 505 corresponding to all the positions that include each position of the multi-display device M1 (for example, any one of the 3×3 positions in the case of the multi-display device M1 shown in FIG. 1). The luminance correcting section 56 selects a table (correction data table) corresponding to the connection position from the multi-luminance correction filter group 505 on the basis of the connection information from the direction sensor 81 and the connection position detecting section 82, and corrects the PWM value with reference to the selected table. The correction of the PWM value will be described in more detail later.

The P/S converter 57 outputs the LED data (including the PWM value) passed through the correction process and transmitted as parallel data, as an LED control signal (including a PWM control signal) that is serial data. The LED control signal is a signal including the PWM value given to each of the areas 600 and a reference current value. Further, the LED control signal is input to the LED driver 61 of the backlight unit 6, and accordingly, the LED driver 61 performs a light emission control (PWM control) for the LED 62 on the basis of the LED control signal.

With such a configuration, the liquid crystal display 1 generates the LCD data and the LED data on the basis of the image data obtained from the image data obtaining section 2 by the image signal processing section 3, and controls the light transmittance of the liquid crystal panel unit 4 and the light emission of the backlight unit 6 for image display.

(Light Emission Control of Backlight Unit)

Figure 4A:
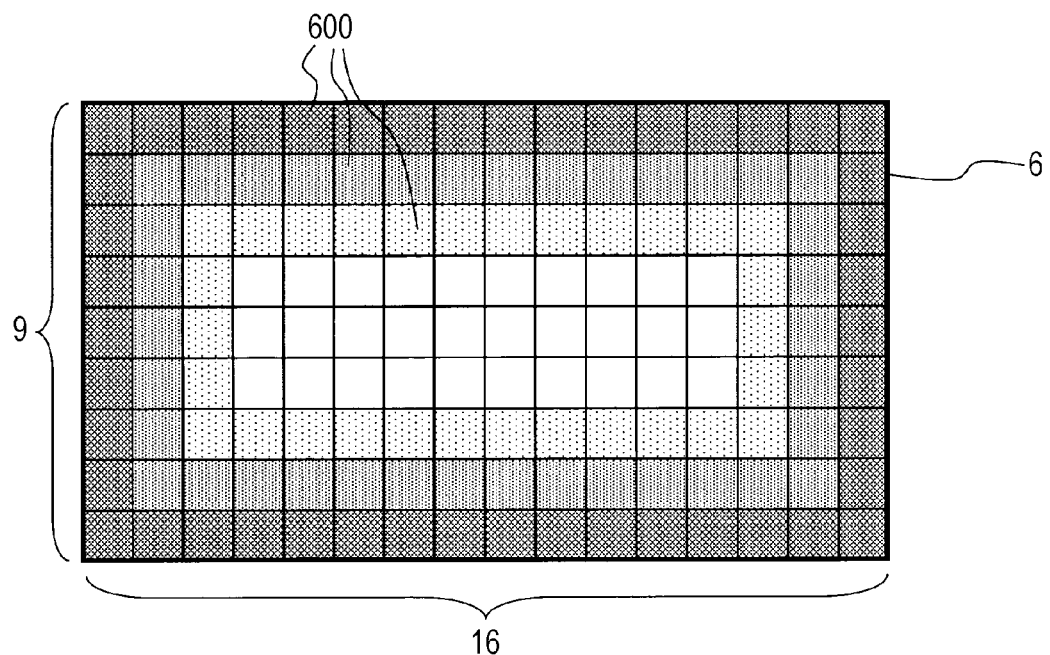
FIG. 4A is a diagram schematically illustrating luminance distribution of planar light from a backlight unit when a liquid crystal display is used as a single body.
Figure 4B:
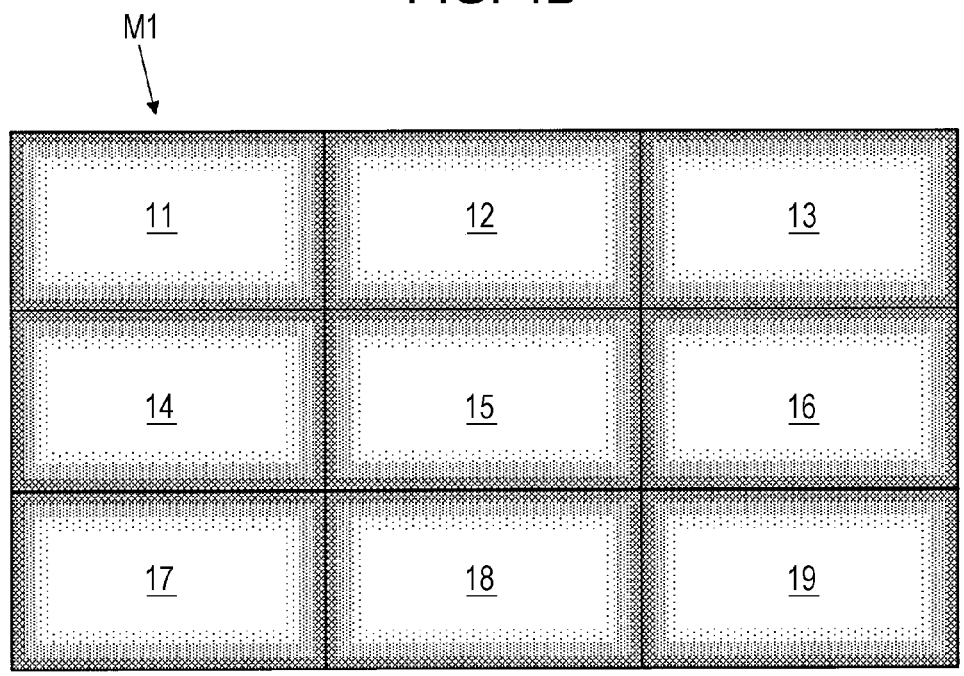
FIG. 4B is a diagram illustrating luminance distribution when the planar light in FIG. 4A is used in a multi-display device.

Next, the luminance correction of the planar light from the backlight unit 6 will be described. First, the luminance correction when the liquid crystal display is used as a single body will be described with reference to the accompanying drawings. FIG. 4A is a diagram schematically illustrating luminance distribution of planar light from a backlight unit when a liquid crystal display is used as a single body, and FIG. 4B is a diagram illustrating luminance distribution when the planar light in FIG. 4A is used in a multi-display device. In FIGS. 4A and 4B, for ease of description, a luminance difference is shown to be stronger than an originally used backlight. FIG. 4A displays the luminance distribution in association with the backlight unit 6.

As described above, in the LED controller 5, the PWM value is subjected to the plurality of correcting processes, but the corrections in the individual variance correcting section 53, the temperature correcting section 54, and the time degradation correcting section 55 are performed to remove the luminance variance of the planar light. These corrections have little to do with the luminance unevenness on the planar light of the multi-display device M1. On the other hand, the correction in the luminance correcting section 56 is performed to reduce the luminance at the peripheral part of the planar light, which causes the luminance unevenness in the planar light of the multi-display device M1. In this view, in the following description, the correction in the luminance correcting section 56 will be described.

As shown in FIG. 4A, the backlight unit 6 emits planar light of which the central part is bright (luminance is high) and the peripheral part is dark (luminance is low) in consideration of the perceptual features of vision. In the backlight unit 6, by adjusting the luminance of the LEDs 62, the luminance distribution as shown in FIG. 4A is given to the planar light. The backlight unit 6 adjusts the luminance of the LED 62 for each of the areas 600. Further, in the following description, the luminance of the LED 62 (luminance for each of the areas 600) is represented as the PWM value.

If the PWM value is expressed as 12 bits (0 to 4095), the PWM value is expressed as 0 when the luminance of the LED 62 is zero. On the other hand, in a case where the LED 62 is set to the maximum luminance, the PWM value is expressed as 4095. For example, when the backlight unit 6 does not emit the planar light, the PWM value is 0 in all the areas 600, and when the backlight unit 6 emits the planar light of the maximum brightness (luminance), the PWM value is 4095 in all the areas 600. In the following description, for ease of understanding, in the luminance correcting section 56, it is assumed that the PWM value of the planar light before correction is 4095 (in the LEDs 62 included) in all the areas 600. In practice, variance may occur due to input image data or due to the above-mentioned various correction processes.

The luminance correcting section 56 corrects the PWM value with reference to the luminance correction LUT 504 stored in the memory 50. FIG. 5A is a diagram illustrating an example of a luminance correction LUT that is used to perform luminance correction, and FIG. 5B is a diagram illustrating PWM values in a partial area corrected by the luminance correction LUT in FIG. 5A. The luminance correction LUT 504 shown in FIG. 5A is a lookup table of an 8-bit correction factor. The luminance correction LUT 504 includes data of a 16 (width)×9 (height) matrix form corresponding to the areas 600 of the backlight unit 6.

As shown in FIG. 5A, the luminance correction LUT 504 is prepared so that numerical values of a central part (10×3 part thereof) are 255, numerical values of an outside part thereof are 245, numerical values of a more outside part thereof are 232, and numerical values of the outermost part thereof are 200. In FIG. 5A, for ease of understanding, the areas are surrounded by thick lines. The luminance correction LUT 504 represents a correction factor for correcting the PWM value corresponding to each of the areas 600. The correction result is shown in FIG. 5B.

For example, since the correction factor is 200 in the areas 600 of the outermost peripheral part of the backlight unit 6, the PWM value is corrected as follows.

PWM value=4095×200/255≅3212

Similarly, since the correction factor is 232 in the areas 600 immediately inside from the outermost peripheral part, the PWM value is corrected as follows.

PWM value=4095×232/255≅3726

Further, since the correction factor is 245 in the further inside areas 600, the PWM value is corrected as follows.

PWM value=4095×245/255≅3934

Further, the correction factor is 255 in the central part of 13×3. That is, the PWM value uses a PWM value in which the correction process is not performed.

PWM value=4095

The luminance correction section 56 performs the correction process of the PWM values in the above-mentioned procedure, and generates LED control signals generated on the basis of the PWM values having the luminance distribution. The LED driver 61 performs the light emission control for the LED 62 using the LED control signals, and thus, adjusts the luminance of the LED 62 for each of the areas 600. By correcting the PWM value using the luminance correction LUT 504 as shown in FIG. 5A, that is, by correcting the PWM value of each of the areas 600 as shown in FIG. 5B, the planar light having the luminance distribution as shown in FIG. 4A is emitted from the backlight unit 6.

In a case where the liquid crystal display 11 is used as a single body, image display is performed by the planar light of the luminance distribution shown in FIG. 4A, and thus, the luminance at the central part of the image display region increases and the luminance of the peripheral part decreases. This is suitable for the perceptual features of human vision, which reduces a possibility of the luminance unevenness being recognized by an observer. Further, it is possible to reduce power consumption of the backlight unit 6.

Next, a case where the liquid crystal display 1 is used as a part of the multi-display device M1 will be described. In the multi-display device M1, nine liquid crystal displays 11 to 19 that are the same as the liquid crystal display 1 are arranged vertically and horizontally. When the luminance distribution of the planar light from the backlight unit 6 of each of the liquid crystal displays 11 to 19 is corrected as shown in FIG. 4A, the luminance distribution of the planar light used for display of the multi-display device M1 becomes the luminance distribution as shown in FIG. 4B.

For example, in the liquid crystal display 11, an upper side and a left side form the peripheral part of the multi-display device M1, but a part of a lower side and a part of a right side do not form the peripheral part of the multi-display device M1. Similarly, in the liquid crystal displays 12 to 19 other than the liquid crystal display 11, a part or all of the sides do not match with the peripheral part of the multi-display device M1 depending on the positions thereof. If the luminance correction is performed using the luminance correction LUT 504 shown in FIG. 5A in each of the liquid crystal displays 11 to 19, a region with low luminance is formed in a part other than the peripheral part of the planar light, as shown in FIG. 4B. The part with low luminance is formed close to the central part, and may be recognized by the human eyes. That is, if the PWM values are corrected by the luminance correction LUT 504 as shown in FIG. 5A, an image with luminance unevenness is displayed on the multi-display device M1.

Thus, in the multi-display device M1, the backlight unit 6 of each of the liquid crystal displays 11 to 19 may emit the planar light from the backlight of each of the liquid crystal displays so that the luminance distribution in consideration of the perceptual features of human vision (the luminance distribution in which the luminance of the peripheral part is low when the multi-display device M1 is considered as one display device) is obtained. An example of the luminance distribution of the planar light in the multi-display device M1 is shown in FIG. 6.

Figure 6:
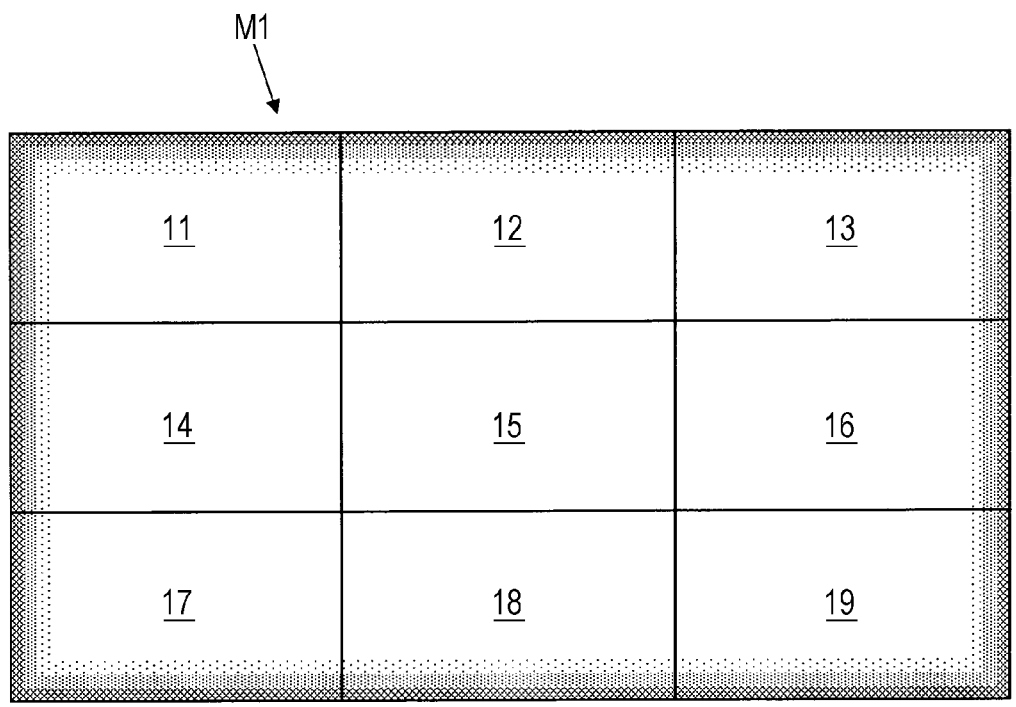
FIG. 6 is a diagram illustrating luminance distribution of planar light in a multi-display device according to an embodiment of the present invention.

The planar light shown in FIG. 6 is given the luminance distribution so that, when the multi-display device M1 is considered as one display device, the luminance at the central part of the display device is high and the luminance at the peripheral part thereof is low. In a case where the planar light having such a luminance distribution is emitted, it is necessary to emit the planar light from the backlight unit 6 in one of the liquid crystal displays 11 to 19 with luminance distribution different from luminance distribution of the backlight unit 6 in another of the liquid crystal displays 11 to 19.

Thus, the memory 50 stores the multi-luminance correction filter group 505 that is used in a case where the liquid crystal displays 11 to 19 are used as the liquid crystal displays that constitute the multi-display device M1, in addition to the luminance correction LUT 504 (shown in FIG. 5A) that is used when each of the liquid crystal displays 11 to 19 is used as a single body. The multi-luminance correction filter group 505 includes nine tables corresponding to the respective positions of the liquid crystal displays 11 to 19. Each table includes the same 144 (16 (width)×9 (height)) correction factors as the number of the areas 600 of the backlight unit 6.

FIG. 7A is a diagram illustrating a part of the multi-luminance correction filter group, and FIG. 7B is a diagram illustrating PWM values corrected by the multi-luminance correction filter group shown in FIG. 7A. A table 5051 shown in FIG. 7A is a table that corrects the PWM values of the liquid crystal display 11 in the multi-display device M1 shown in FIG. 1. The multi-luminance correction filter group 505 performs correction by 8 bits, similarly to the case where the luminance correction LUT 504 is used.

As shown in FIG. 7A, the table 5051 is prepared so that correction factors of the areas 600 adjacent to the upper side and the left side are 200, correction factors that are present immediately inside are 232, correction factors that are present further inside are 245, and the remaining correction factors are 255. As shown in FIG. 7A, the table 5051 has the correction factors of 255 at a lower right 13×9 part thereof. Further, the PWM value of the area 600 with the correction factor of 200 is 3212, the PWM value of the area 600 with the correction factor of 232 is 3726, the PWM value of the area 600 with the correction factor of 245 is 3934, and the PWM value of the area 600 with the correction factor of 255 is 4095.

By correcting the PWM values of the backlight unit 6 of the liquid crystal display 11 as described above, the backlight unit 6 of the liquid crystal display 11 may emit the planar light in which the luminance at the peripheral part of the upper left corner thereof is low (see FIG. 6).

Another example of the table will be described with reference to the accompanying drawings. FIG. 8A is a diagram illustrating a table of a part different from the part shown in FIG. 7A, and FIG. 8B is a diagram illustrating PWM values corrected by the table in FIG. 8A. FIG. 8A is a table that corrects the PWM values of the liquid crystal display 12 that is positioned at the upper central part of the multi-display device M1.

As shown in FIG. 6, in the multi-display device M1, it is necessary to reduce the luminance of a side of the liquid crystal display 12 close to the upper side of the multi-display device M1. In this view, a table 5052 that corrects the PWM values of the backlight unit 6 provided in the liquid crystal display 12 is as follows.

That is, the correction factors of the areas 600 along the upper side are 200, the correction factors of the areas 600 that are present immediately below are 232, the correction factors of the areas 600 that are present further below are 245, and the remaining correction factors are 255. Further, the PWM values corrected by the table 5052 are as shown in FIG. 8B.

By lighting the LEDs 62 with the PWM values as shown in FIG. 8B, the backlight unit 6 of the liquid crystal display 12 may emit the planar light with the luminance distribution as shown in FIG. 6.

Figure 9:
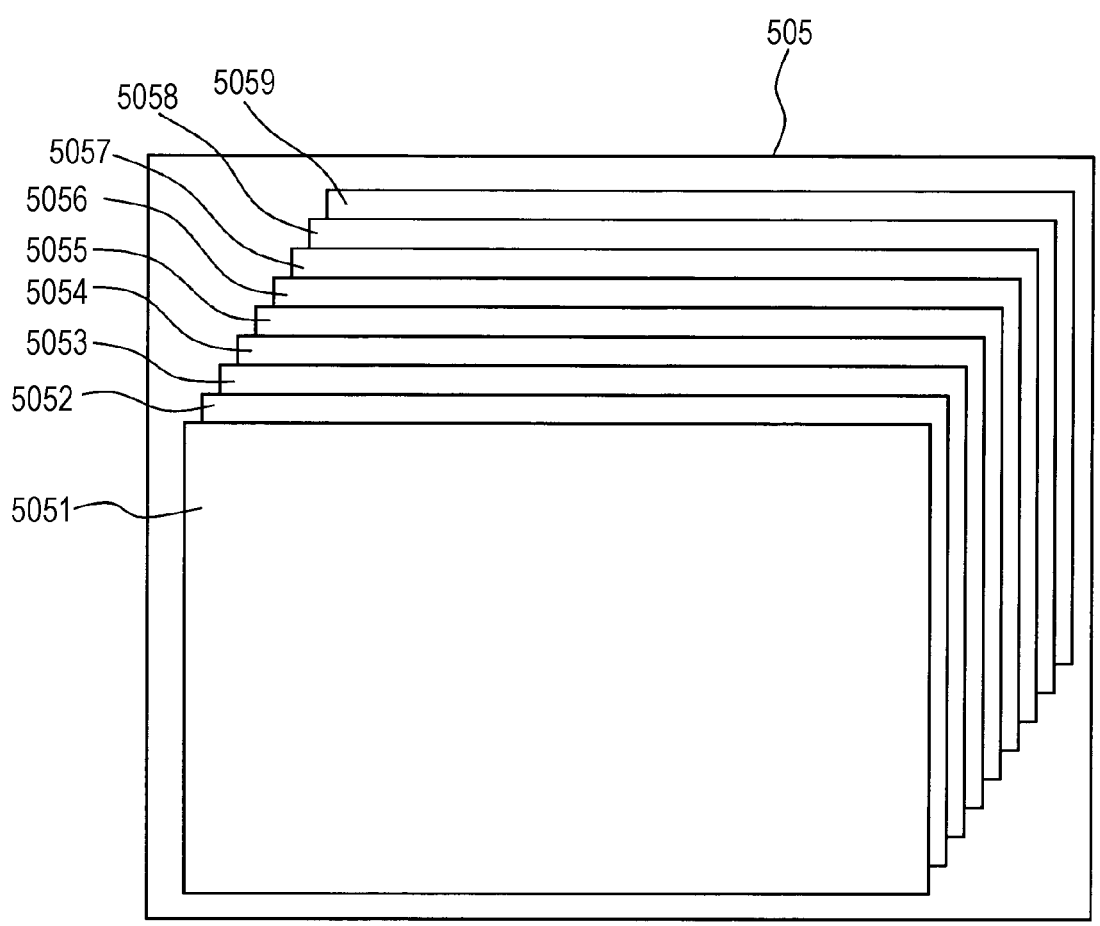
FIG. 9 is a diagram schematically illustrating an example of a multi-luminance correction filter group.

FIG. 9 is a diagram schematically illustrating an example of the multi-luminance correction filter group. FIG. 9 is a diagram illustrating the concept of a configuration state of the multi-luminance correction filter group. As shown in FIG. 9, the multi-luminance correction filter group 505 includes tables 5051 to 5059 corresponding to the respective positions of the liquid crystal displays 11 to 19.

The luminance correcting section 56 should refer to a table corresponding to the position of each liquid crystal display from the tables 5051 to 5059. Thus, direction information on the installation direction (horizontal orientation or vertical orientation) of the liquid crystal display detected by the direction sensor 81 and connection information including connection position information about the position of the liquid crystal display 1 in the multi-display device M1, detected by the connection position detecting section 82, that is, the position of a specific liquid crystal display among the liquid crystal displays 11 to 19 is transmitted to the luminance correcting section 56 from the connection state detecting section 8.

Further, the connection position detecting section 82 may perform the detection by an adjacently arranged liquid crystal display when a liquid crystal display is connected to constitute the multi-display device. For example, in a case where the connection position detecting section 82 detects that the liquid crystal displays are connected below and on the right, the connection position detecting section 82 detects that the liquid crystal display 1 is the liquid crystal display 11 that is arranged on the upper left of the multi-display device M1. The detection of the connection position is not limited thereto.

If the direction information and the connection position information are obtained, the luminance correcting section 56 refers to the corresponding table 5051 to 5059 from among the multi-luminance correction filter group 505 stored in the memory 50. For example, in a case where the information about the liquid crystal display being the liquid crystal display 11 is obtained, the luminance correcting section 56 refers to the table 5051, and performs the correction of the PWM values.

Further, in the multi-display device M1, there may be a variance in color tone and luminance of the planar light for each liquid crystal display. Thus, after the PWM values are corrected, information on luminance levels in adjacent liquid crystal displays may be exchanged to perform correction so that the luminance levels coincide with each other. By performing the correction as described above, it possible to correct luminance variance between the liquid crystal displays, and to improve the quality of image display in the multi-display device.

By performing the above-mentioned luminance correction, it is possible to provide the multi-display device M1 capable of reducing power consumption in the backlight unit while suppressing an observer from recognizing luminance unevenness.

Figure 10:
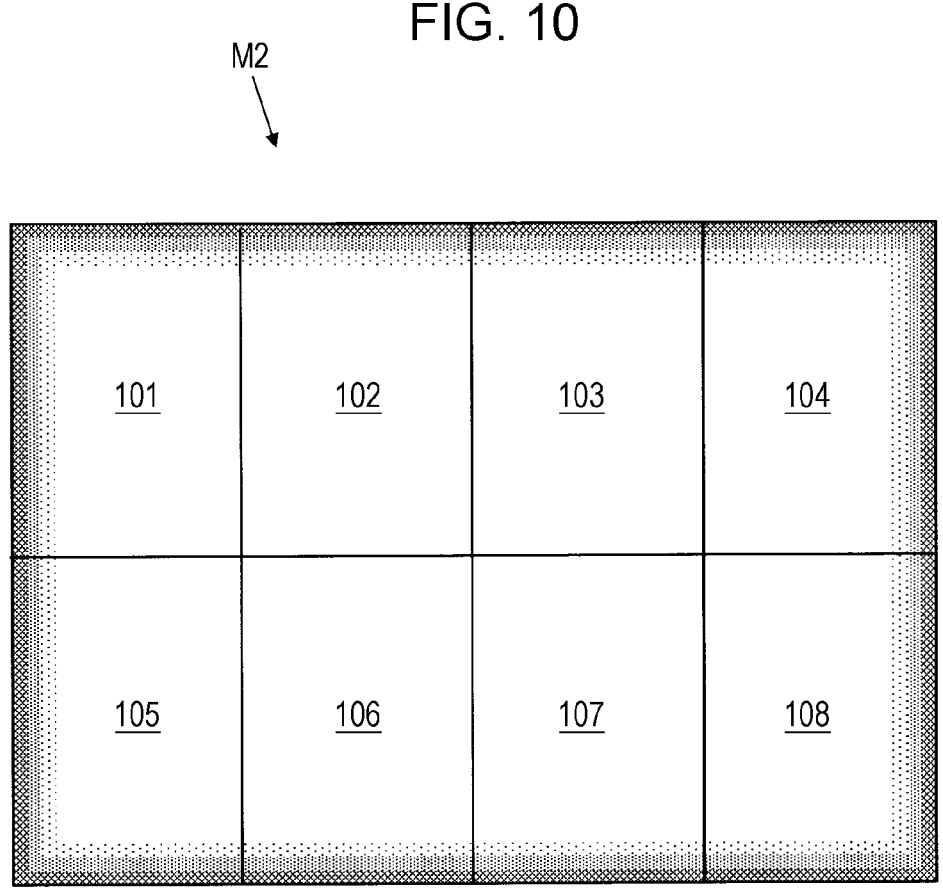
FIG. 10 is a diagram illustrating luminance distribution of another example of a multi-display device.

Further, there is a method other than the multi-display device M1 shown in FIG. 1 as the multi-display device that uses the liquid crystal displays 1. Hereinafter, another example of the multi-display device will be described with reference to the drawings. FIG. 10 is a diagram illustrating luminance distribution of another example of the multi-display device. In the multi-display device M1 shown in FIG. 1, the liquid crystal displays 1 are arranged horizontally, but may be arranged vertically (4 (width)×2 (height)) as in a multi-display device M2 shown in FIG. 10.

The multi-luminance correction filter group 505 stored in the memory 50 of the liquid crystal display 1 includes tables (not shown) corresponding to liquid crystal displays 101 to 108 that constitute the multi-display device M2, in a similar way to the tables corresponding to the liquid crystal displays 11 to 19 of the multi-display device M1.

As described above, when the liquid crystal displays are arranged vertically, in the connection state detecting section 8 of the liquid crystal display 1, the direction sensor 81 detects that the liquid crystal displays are arranged vertically, and the connection position detecting section 82 detects the connection position. The connection state detecting section 8 transmits information on the installation direction (direction information) and information on the connection position (connection position information) to the luminance correcting section 56. Further, the luminance correcting section 56 appropriately selects and refers to a table corresponding to any one of the liquid crystal displays 101 to 108 from the multi-luminance correction filter group 505 on the basis of the direction information and the connection position information, to correct the PWM values.

By the above-described luminance correction, it is possible to provide the multi-display device M2 capable of reducing power consumption in the backlight unit while suppressing an observer from recognizing luminance unevenness. Further, the luminance correcting section 56 may detect the connection state (3×3 or 4×2) of the multi-display device using the direction information detected by the direction sensor 81, and to perform luminance correction based on the connection state.

Further, in the multi-display device M1 or M2, the luminance and/or luminance distribution of planar light may be adjusted according to installation places, display images, power consumption or the like. For example, there are three modes (referred to as display modes) of a bright screen display mode used in a case where the multi-display device is installed in a bright place, for example, an intermediate luminance screen display mode obtained by balancing image luminance and power consumption, and a dark screen display mode for low power consumption. The luminance correction LUT 505 includes tables based on the respective modes. In this case, the luminance correcting section 56 selects a table corresponding to any one of the liquid crystal displays 11 to 19 from the multi-luminance correction filter group 505, on the basis of direction information, connection position information and mode information from the connection state detecting section 8. The display mode information may be included in the LED data transmitted from the image signal processing section 3, or may be separately transmitted to the luminance correcting section 56 from the image signal processing section 3.

When the multi-display device M1 or M2 is configured, the direction and position of the liquid crystal display 1 may not be determined in advance, and the liquid crystal display 1 may be used in any position. Thus, the multi-luminance correction filter group 505 includes tables corresponding to the respective liquid crystal displays 11 to 19 or the liquid crystal displays 101 to 109. Accordingly, data about the luminance correction LUT 505 corresponds to number of areas of liquid crystal display×bit number of correction factors×(number of liquid crystal displays of multi-display device M1+number of liquid crystal displays of multi-display device M2)×(number of display modes) (here, 31104 bits).

Further, as the multi-luminance correction filter group 505, a part corresponding to the connection position may be referred to from tables (48×27 and 36×32) corresponding to the entire multi-display device. In this case, the amount of data is the same as in a case where tables corresponding to each liquid crystal display are provided. The memory 50 of the LED controller 5 of each of the liquid crystal displays 11 to 19 stores the multi-luminance correction filter group 505.

Second Embodiment

In the above-described multi-display device, when the PWM values are not corrected, a liquid crystal display capable of emitting planar light with uniform luminance distribution is used. On the other hand, there is a liquid crystal display (image display device with uniform luminance distribution) that includes a backlight unit that emits planar light with luminance distribution in consideration of sensitivity features of human vision, without correction using the arrangement of the LEDs 62, reflection at the peripheral part, and the like.

In a case where a multi-display device includes a liquid crystal display with non-uniform luminance distribution, by providing tables corresponding to a liquid crystal display that uses a backlight unit with non-uniform luminance distribution in a multi-luminance correction filter group, it is possible to optimize luminance distribution of the multi-display device.

On the other hand, in a multi-display device that includes both of a liquid crystal display with non-uniform luminance distribution and a liquid crystal display with uniform luminance distribution, it is necessary to provide both of a multi-luminance correction filter group corresponding to the liquid crystal display with non-uniform luminance distribution and a multi-luminance correction filter group corresponding to the liquid crystal display with uniform luminance distribution, which causes increase in a storage capacity. Thus, in the liquid crystal display with non-uniform luminance distribution, by performing correction to achieve uniform luminance distribution, and then, by again performing correction to achieve an optimal luminance distribution when the liquid crystal display with non-uniform luminance distribution is considered as the multi-display device, it is possible to optimize the luminance distribution of the multi-display device.

Figure 11:
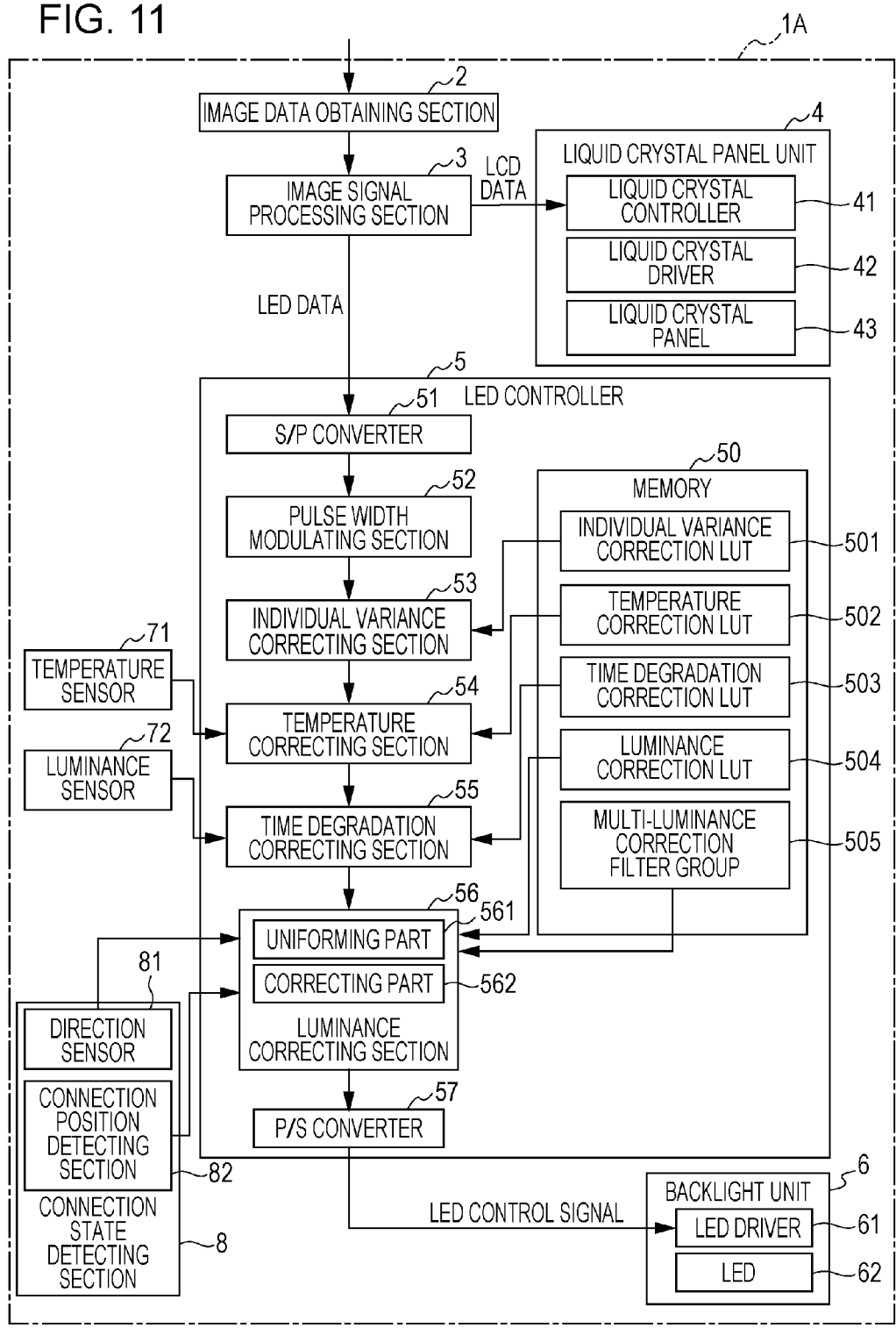
FIG. 11 is a block diagram illustrating a configuration of a liquid crystal display that constitutes a multi-display device according to an embodiment of the present invention.

Hereinafter, a liquid crystal display of which the luminance distribution is once uniformized and then is optimized for a multi-display device will be described with reference to the accompanying drawings. FIG. 11 is a block diagram illustrating a configuration of a liquid crystal display. A liquid crystal display 1A shown in FIG. 11 includes a uniformizing part 561 and a correcting part 562 in the luminance correcting section 56. The liquid crystal display 1A first corrects the PWM value corresponding to each of the areas 600 so that planar light with uniform luminance distribution can be emitted from the backlight unit 6 of the liquid crystal display 1A to the uniformizing part 561. Further, a correction table stored in the memory 50 is used for the correction. The correction table is a table that has a configuration that is reverse to the luminance correction table. That is, the correction factor at the central part is small and increases toward the outside.

Further, the correcting part 562 has the same configuration as that of the above-described luminance correcting section 56. That is, the correcting part 562 selects a table corresponding to the liquid crystal display from the multi-luminance correction filter group 505 on the basis of connection information on the liquid crystal display, and corrects the PWM values. By performing uniformization once as described above, it is possible to arrange luminance levels between adjacent liquid crystal displays. Thus, even though the multi-display device is configured by using the liquid crystal display with non-uniform luminance distribution, it is possible to display an image with luminance distribution in consideration of the perceptual features of human vision, and to perform the luminance correction while suppressing an observer from recognizing luminance unevenness.

Third Embodiment

Figure 12:
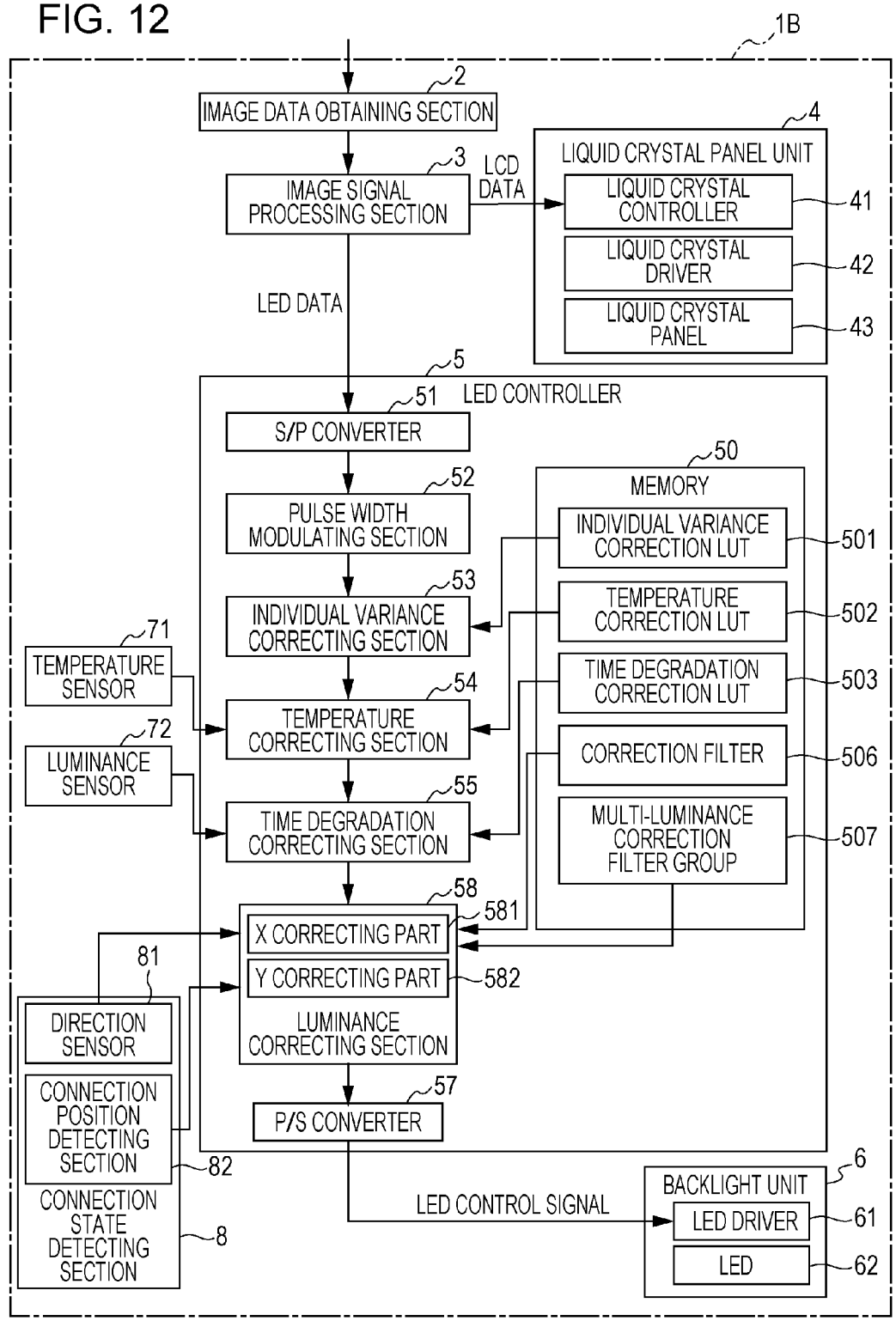
FIG. 12 is a block diagram illustrating another example of a liquid crystal display that constitutes a multi-display device according to an embodiment of the present invention.
Figure 13:
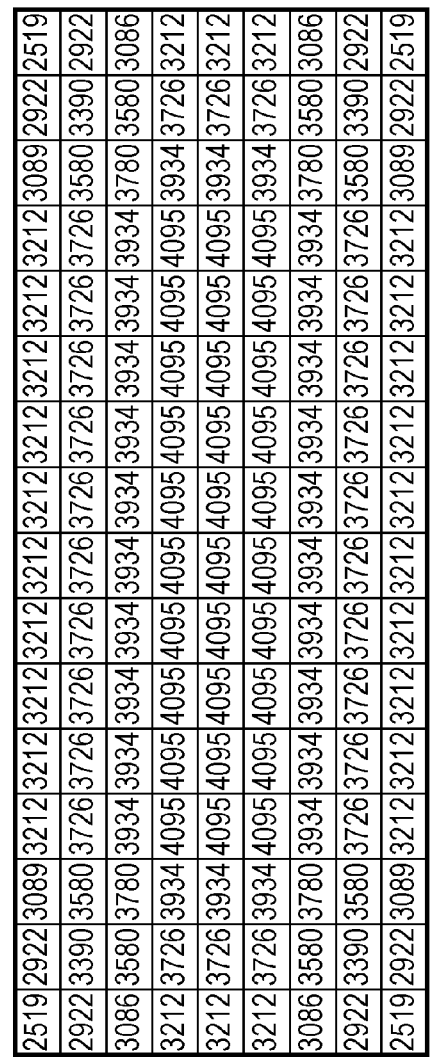
FIG. 13 is a diagram illustrating correction of PWM values by means of a luminance correcting section.

A correction method of PWM values in a luminance correcting section provided in a liquid crystal display according to an embodiment of the present invention will be described with reference to the accompanying drawings. FIG. 12 is a block diagram illustrating another example of a liquid crystal display, and FIG. 13 is a diagram illustrating correction of PWM values in the luminance correcting section. As shown in FIG. 12, a liquid crystal display 1B has the same configuration as that of the liquid crystal display 1 shown in FIG. 3 except for a luminance correcting section 58, in which the same reference numerals are given to substantially the same sections, and description about the same sections will be omitted. As shown in FIG. 11, the luminance correcting section 58 includes an X correcting part 581 and a Y correcting part 582. Luminance correction shown in FIG. 13 is an example, in which the PWM value set to each of the areas 600 is 4095.

The X correcting part 581 corrects (X correction) the PWM value for each of the areas 600 every row, by handling a row (St1 to St9) arranged in a horizontal direction (X direction) in a batch. Further, the Y correcting part 582 corrects (Y correction) the PWM value for each of the areas 600 every column, by handling a column (Pr1 to Pr16) arranged in a vertical direction (Y direction) in a batch.

A correction filter 506 provided with a filter (X filer) 5061 that includes correction factors for correction of the rows (St1 to St9) and a filter (Y filter) 5062 that includes correction factors for correction of the columns is stored in the memory 50.

As shown in FIG. 13, the luminance correcting section 58 performs the X correction for the PWM values before correction, and then, performs the Y correction. When the luminance correcting section 58 performs the X correction, the luminance correcting section 58 refers to the X filter 5061. The X filter 5061 has 16 correction factors that are arranged in the X direction. The correction is sequentially performed in the row unit from the first row St1 of the PWM values for each of the areas 600 to the ninth row St9 with reference to the X filter 5061, and the first row St1 to the ninth row St9 are arranged in the above-described order. The numeral values after correction are as shown in FIG. 13, and since a calculation expression of correction is the same as in the luminance correcting section 56, description thereof will be omitted.

If the X correction is finished, the Y correction is performed. The Y filter 5062 for the Y correction includes 9 correction factors that are arranged in the Y direction. The luminance correcting section 58 sequentially performs the correction in the column unit from the first column Pr1 to the sixteenth column Pr16 from the left of the PWM values for the PWM values for each of the areas 600 with reference to the Y filter 5062, and the first column Pr1 to the sixteenth column Pr16 are arranged in the above-described order (see FIG. 13). According to such a correction method, it is also possible to emit planar light with high luminance at the central part and with low luminance at the peripheral part.

Further, the memory 50 further includes a multi-luminance correction filter group 507 for luminance correction of the multi-display device. Here, a configuration M1 in which 9 (3×3) liquid crystal displays are provided will be described as an example of the multi-display device. The multi-luminance correction filter group 507 includes an X filter 5071 and a Y filter 5072 (correction data table) for each connection position of the liquid crystal displays so as to cope with a case where the liquid crystal display 1B is used in any position to constitute the multi-display device.

The luminance correcting section 58 corrects the PWM values with reference to the X filter 5071 and the Y filter 5072 corresponding to the positions of the liquid crystal displays in the multi-display device from the multi-luminance correction filter group 507 on the basis of the X filter 5071 and the Y filter 5072, on the basis of the direction information from the direction sensor 81 and the connection position information from the connection position detecting section 82. Since the X correction and Y correction are the same as in the above description, and detailed description thereof will be omitted.

In a case where the correction filter 506 and the multi-luminance correction filter group 507 are used, it is necessary to correct the PWM values for each row or each column. On the other hand, the amount of information of the multi-luminance correction filter group 507 is considerably small compared with the multi-luminance correction filter group 505 that uses the tables in which the correction factor is set for each of the areas 600.

Details of the amount of information are as follows. That is, the amount of information becomes the sum of the amount of information of the X filter 5071 of each liquid crystal display and the amount of information of the Y filter 5072 thereof. That is, the amount of information of the X filter 5071 is "number of areas 600 per row X bit number of correction factor X (number of liquid crystal displays in multi-display device M1+number of liquid crystal displays in multi-display device M2)×(number of modes)" (here, 6528 bits). Further, the amount of information of the Y filter 5072 is "number of areas 600 per column×bit number of correction factor×(number of liquid crystal displays in multi-display device M1+number of liquid crystal displays in multi-display device M2)" (3672 bits). Thus, the amount of information of the multi-luminance correction filter group 507 is 10200 bits.

It can be understood that the amount of information of the multi-luminance correction filter group 507 is 10200 bits, which may be considerably reduced compared with the multi correction LUT 505 of which the amount of information is 31104. By using such a multi-luminance correction filter group 507 and by providing the luminance correcting section 58 that performs correction using the multi-luminance correction filter group 507, it is possible to reduce the capacity of the memory 50.

Fourth Embodiment

Figure 14:
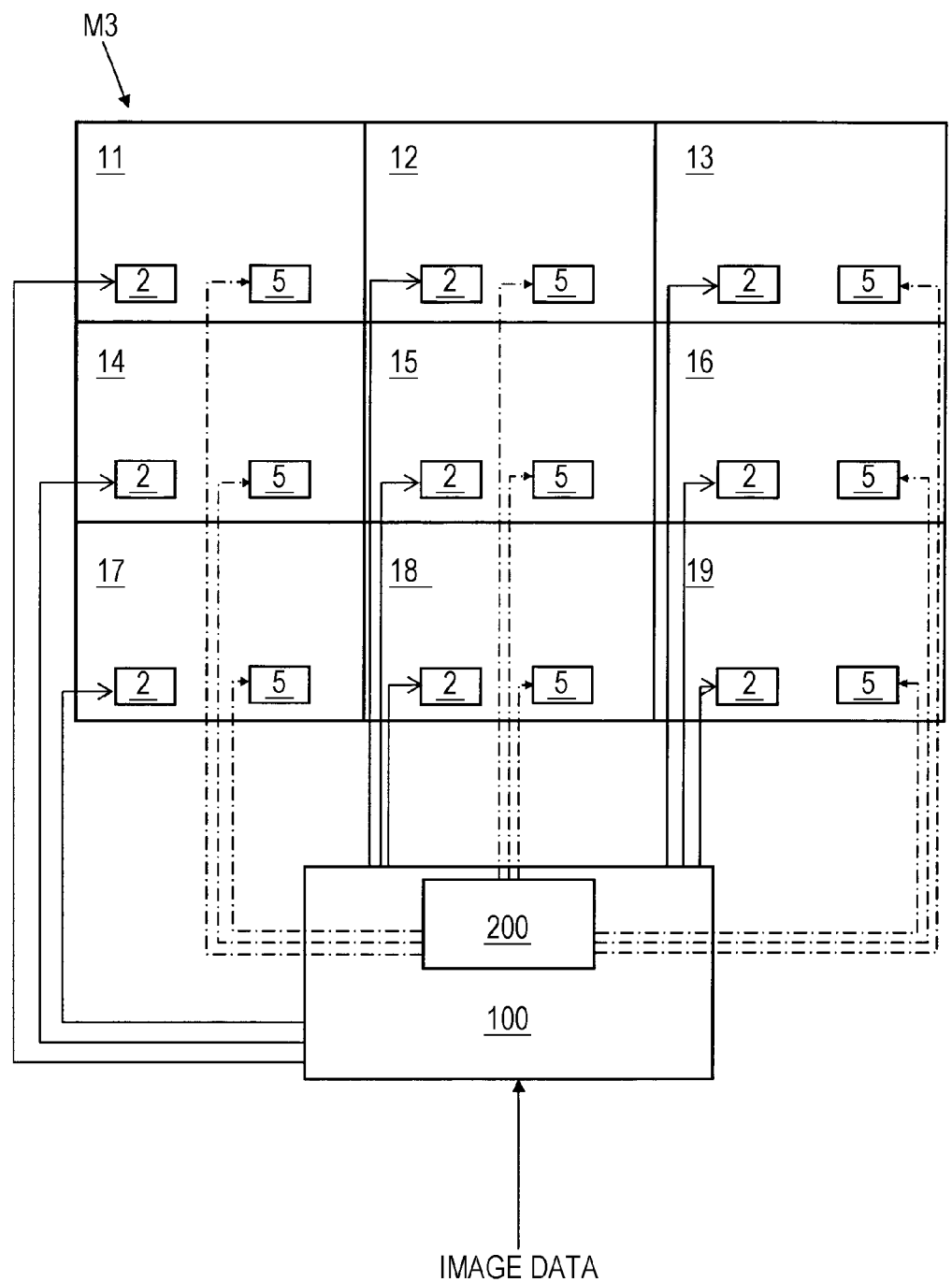
FIG. 14 is a diagram illustrating an overall configuration of another example of a multi-display device according to an embodiment of the present invention.
Figure 15:
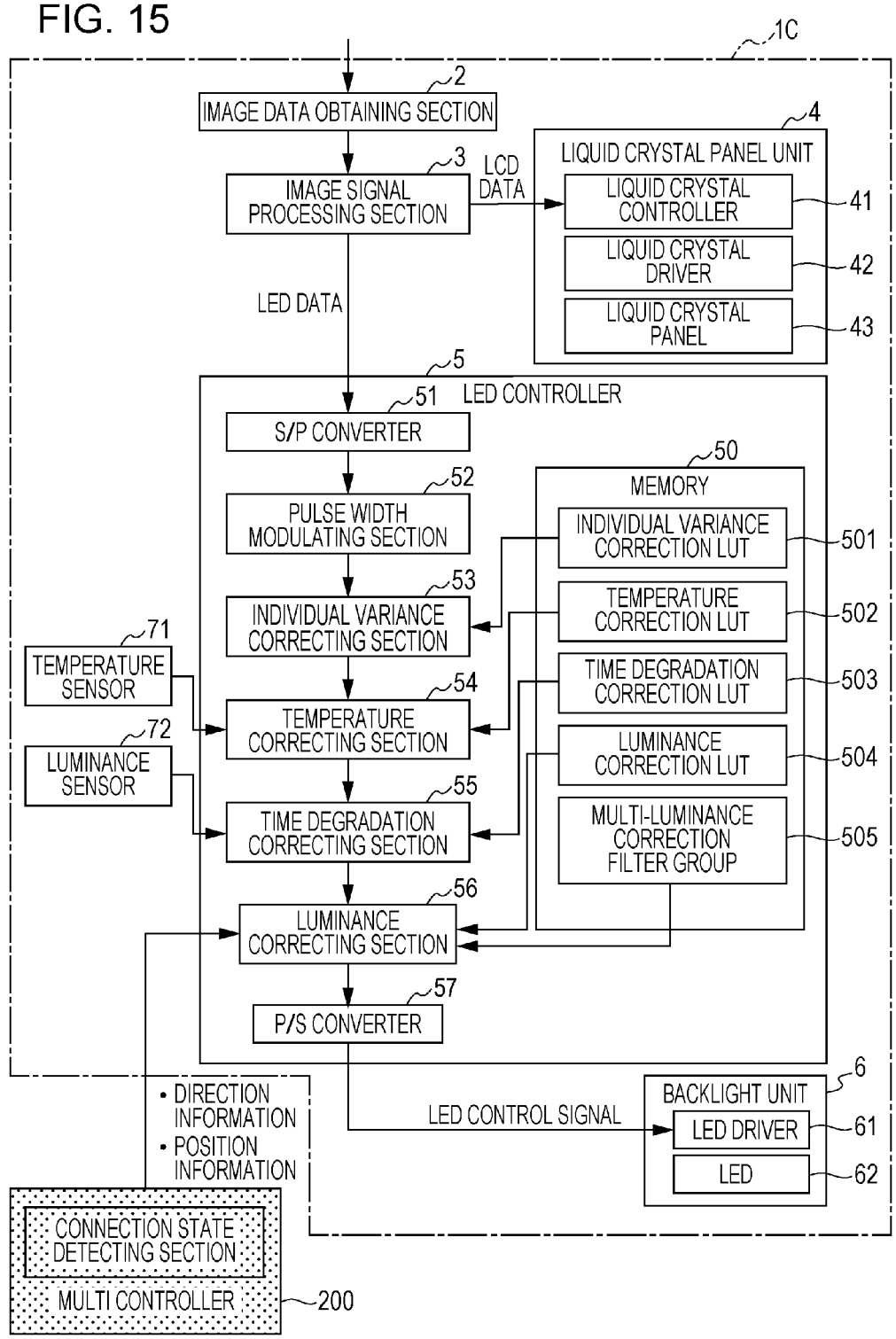
FIG. 15 is a block diagram illustrating a configuration of a liquid crystal display that constitutes the multi-display device shown in FIG. 14.

Another example of a liquid crystal display that constitutes a multi-display device according to an embodiment of the present invention will be described with reference to the accompanying drawings. FIG. 14 is a diagram illustrating an overall configuration of another example of a multi-display device according to an embodiment of the present invention, and FIG. 15 is a block diagram illustrating a configuration of a liquid crystal display that constitutes the multi-display device shown in FIG. 14. Here, since the basic configuration of the liquid crystal display is substantially the same as that of the liquid crystal display shown in FIG. 2, description about the same sections will be omitted.

In a multi-display device M3 shown in FIG. 14, an external controller 200 (external control means) that is connected to liquid crystal displays 11 to 19 of the multi-display device M3 and supplies connection position information and direction information is provided. Further, in the multi-display device M3 shown in FIG. 14, the external controller 200 is arranged in the image distributer 100, but this is not limitative. The external controller 200 may be separately provided from the image distributer 100.

The external controller 200 provides, to the connected liquid crystal displays 11 to 19, information about the connection positions and information about the direction thereof. In the multi-display device M3, the external controller 200 is directly connected to the LED controller 5 of each of the liquid crystal displays 11 to 19, but this is not limitative. A configuration may be used in which a signal from the external controller 200 is input to a main controller (not shown) of the liquid crystal display and is then transmitted from the main controller to the luminance correcting section 56 of the LED controller 5. Further, a configuration may be used in which the external controller 200 provides the connection position information to each liquid crystal display and the direction information is detected by the direction sensor 81 of each liquid crystal display.

Then, the liquid crystal display that constitutes the multi-display device M3 will be described. Since the liquid crystal displays 11 to 19 have the same configuration, here, a configuration of a liquid crystal display 1C will be described as a representative. Since the liquid crystal display 1C shown in FIG. 15 has the same configuration as that of the liquid crystal display 1 shown in FIG. 3 except that the connection state detecting section 8 is not provided, the same reference numerals are given to substantially the same sections, and description about the same sections will be omitted.

As shown in FIG. 15, the luminance correcting section 56 of the liquid crystal display 1C is connected to the external controller 200, and receives the direction information and the connection position information from the external controller 200. The luminance correcting section 56 selects an appropriate table from among tables 5051 to 5059 corresponding to the liquid crystal displays 11 to 19 from the multi-luminance correction filter group 505, on the basis of the direction information and the connection position information, and corrects PWM values with reference to the selected table.

As described above, in the liquid crystal display 1C, since the external controller 200 is operated as the connection state detecting section 8 that detects the direction information and the connection position information and transmits connection information including the respective information, it is possible to omit the connection state detecting section 8 (the connection position detecting section 82 in a case where the direction information is detected by the direction sensor 81) of each liquid crystal display, and thus, to simplify the configuration of the liquid crystal displays.

Further, a configuration may be used in which the external controller 200 determines an appropriate table among the tables included in the multi-luminance correction filter group 505 and table designation information that is information for designating the table is transmitted from the external controller 200 to the luminance correcting section 56. According to this configuration, it is not necessary for the luminance correcting section 56 to perform an operation (calculation) of selecting an appropriate table from the multi-luminance correction filter group 505, and thus, it is possible to reduce the burden of the luminance correcting section 56.

Further, in a case where the liquid crystal display 1C has a configuration that includes the luminance correcting section 58, the correction filter 506 and the multi-luminance correction filter group 507 similarly to the liquid crystal display 1B, the same effects may be achieved. The external controller 200 may be mounted on any one of the liquid crystal displays that constitute the multi-display device M3.

In the above-described first to third embodiments, the multi-luminance correction filter group 505 or the multi-luminance correction filter group 507 are provided in the liquid crystal display 1 (1B or 1C). In this case, it is necessary to determine the arrangement (for example, 3 (width)×3 (height), 4 (width)×2 (height) or the like) of the multi-display device in advance.

Fifth Embodiment

Figure 16:
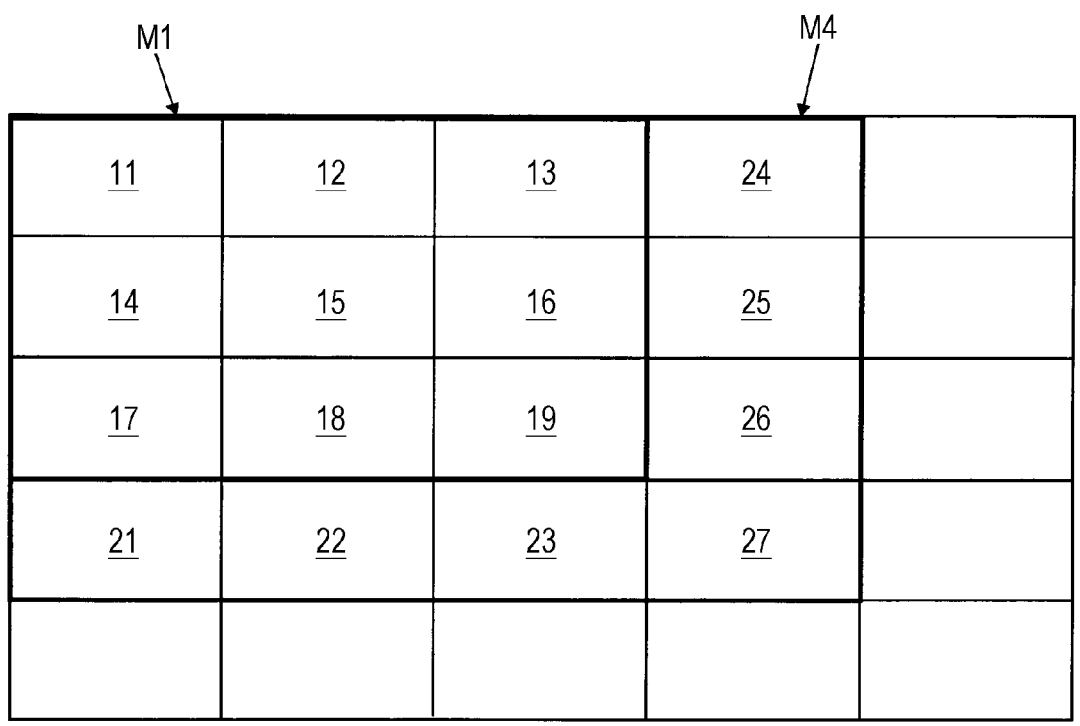
FIG. 16 is a diagram illustrating a state in which a plurality of liquid crystal displays are arranged.

Still another example of a multi-display device according to an embodiment of the present invention will be described with reference to the accompanying drawings. FIG. 16 is a diagram illustrating a state in which a plurality of liquid crystal displays are arranged. FIG. 16 shows an example in which the liquid crystal displays are used horizontally. As shown in FIG. 16, in the multi-display device, by changing the number of arranged liquid crystal displays and arrangement direction, it is possible to change the size of an image display section.

As shown in FIG. 16, if the arrangement of the liquid crystal displays is changed, the peripheral part up to now does not serve as the peripheral part any more. For example, in a case where 7 liquid crystal displays are added to a multi-display device (configuration of the multi-display device M1 shown in FIG. 1 or the like) in which liquid crystal displays are arranged in the form of 3 (width)×3 (height) to configure a multi-display device M4 in which liquid crystal displays are arranged in the form of 4 (width)×4 (height), the lower sides of liquid crystal displays 17 to 19 that form the lower peripheral part in the multi-display device M1 do not serve as the peripheral part any more. Similarly, the right sides of the liquid crystal displays 13, 16 and 19 that form the right peripheral part do not serve as the peripheral part any more.

If the multi-display device M4 is corrected by the above-described multi-luminance correction filter group 505 or multi-luminance correction filter group 507, planar light with low luminance is emitted to the parts that have served as the peripheral parts on the lower and right sides of the multi-display device M1. A part with low luminance is generated in the vicinity of the central part in such planar light, which does not match with the perceptual features of human vision, to thereby cause easy observation of luminance unevenness.

Figure 17:
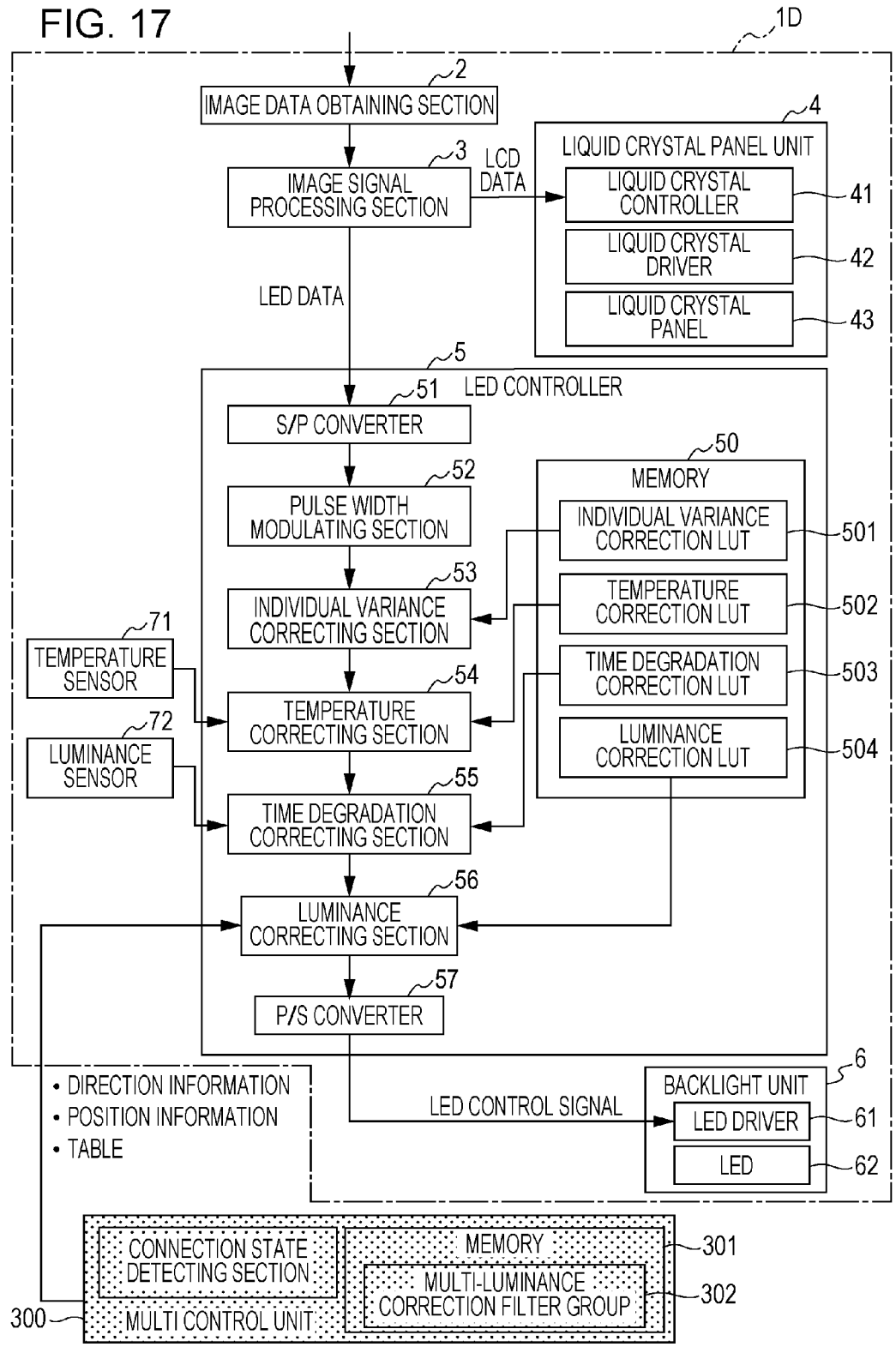
FIG. 17 is a block diagram illustrating still another example of a liquid crystal display that constitutes a multi-display device according to an embodiment of the present invention.

For this reason, the multi-display device M4 in which the number of connections may be changed is provided with an external controller 300. FIG. 17 is a block diagram illustrating a configuration of a liquid crystal display used for a multi-display device according to an embodiment of the present invention. In a liquid crystal display 1D shown in FIG. 17, the external controller 300 is also shown.

As shown in FIG. 17, the external controller 300 includes a memory 301, and a multi-luminance correction filter group 302 is stored in the memory 301. The multi-luminance correction filter group 302 includes tables for correction of PWM values in each liquid crystal display when horizontal liquid crystal displays are arranged in the form of 2×2 to 5×5, and tables for correction of PWM values in each liquid crystal display when vertical liquid crystal displays are arranged in the form of 4×2, 2×5, 3×4 and 3×5.

The external controller 300 is connected to each liquid crystal display that constitutes the multi-display device M4, and includes a function of detecting direction information and connection position information about each liquid crystal display. The external controller 300 recognizes the shape (the number of arrangements of liquid crystal displays) of the multi-display device M4 using the direction information and connection position information, selects a table corresponding to each liquid crystal display from the multi-luminance correction filter group 302, and transmits information about the table to each liquid crystal display.

If the table is received from the external controller 300, the liquid crystal display 1D corrects PWM values on the basis of the table. In the case of such a configuration in which the table information is supplied to the liquid crystal display 1D from the external controller 300, the PWM values are within a predetermined range, but even though the number of liquid crystal displays that constitute the multi-display device is changed, it is possible to correct the luminance of planar light from the backlight unit 6. Further, since a multi-luminance correction filter group may not be stored in the liquid crystal display 1D, it is possible to reduce the capacity of the memory 50.

Further, in the above description, an example in which the multi-luminance correction filter group 302 that is the same as the multi-luminance correction filter group 505, provided with a table in which correction factors are arranged in the matrix form, is used for each of the areas 600 has been described, but a multi-luminance correction filter group that has the same configuration as that of the multi-luminance correction filter group 507 may be used. If the configuration of the multi-luminance correction filter group 507 is employed, the amount of information to be transmitted to each liquid crystal display 1D from the external controller 300 is reduced, thereby facilitating the control.

Sixth Embodiment

Figure 18:
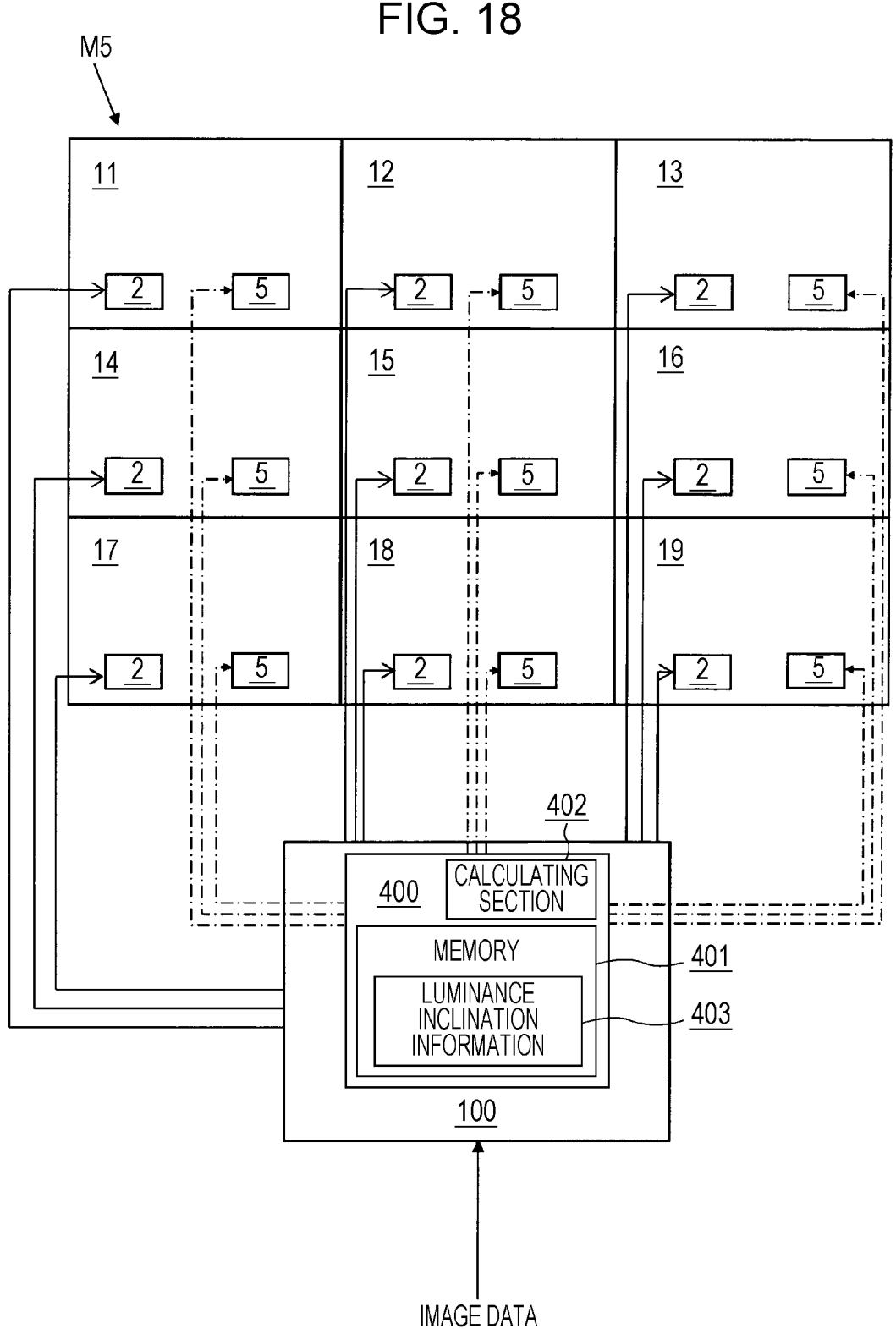
FIG. 18 is a diagram illustrating an overall configuration of still another example of a multi-display device according to an embodiment of the present invention.

Still another example of a multi display device according to an embodiment of the present invention will be described with reference to the accompanying drawings. FIG. 18 is a diagram illustrating an overall configuration of still another example of a multi-display device according to an embodiment of the present invention. A multi-display device M5 shown in FIG. 18 includes an external controller 400. As shown in FIG. 18, the external controller 400 includes a memory 401 and a calculating section 402.

The multi-display device M5 is normally used as one image display device. In the external controller 400, luminance inclination information 403 when the multi-display device M5 is considered as one image display device is stored in the memory 401. Horizontal luminance inclination information and vertical luminance inclination information thereof respectively correspond to ratios (or weights) of the horizontal luminance and vertical luminance to the luminance (maximum luminance) of a maximum output of the LED 62.

The luminance inclination information 403 corresponds to information including relative coordinates on the horizontal axis and the vertical axis of the image display section and the ratio (weight) of luminance at that position. That is, the luminance inclination information 403 is data that indicates luminance distribution using the relative coordinates and the relative luminance of the image display section. By changing the relative coordinates according to the size (for example, 3 (width)×3 (height), 4 (width)×4 (height) or the like) of the multi-display device and determining correction factors at that position, it is possible to generate a correction factor for each of the areas 600 of each liquid crystal display.

By providing the luminance inclination information 403 as described above, the calculating section 402 of the external controller 400 may generate a multi-luminance correction filter group on the basis of the arrangement of the liquid crystal displays in the multi-display device M5 and the luminance inclination information 403. Further, by setting the luminance inclination information 403 according to the ratio of luminance based on the relative coordinates of the image display section, even though the size of the multi-display device M5 is changed, it is possible to generate the multi-luminance correction filter group. Thus, even though the arrangement of the liquid crystal displays is changed, the multi-display device M5 may perform an appropriate luminance correction.

Further, a configuration may be used in which the calculating section 402 generates a multi-luminance correction filter group corresponding to the multi-luminance correction filter group 507 and an appropriate filter group is transmitted from the multi-luminance correction filter group to each liquid crystal display. Further, a configuration may be used in which the calculating section 402 is provided in the LED controller 5 of each liquid crystal display, the luminance inclination information 403 corresponding to the position of each liquid crystal display is received from the external controller 400, and a table or filter is generated in the LED controller 5.

Seventh Embodiment

Still another example of a multi-display device according to an embodiment of the present invention will be described with reference to the accompanying drawings. FIG. 19 is a diagram illustrating an overall configuration of still another example of a multi-display device according to an embodiment of the present invention, and FIGS. 20A and 20B are diagrams illustrating luminance distributions of planar light in the multi-display device shown in FIG. 19.

As shown in FIG. 19, a multi-display device M6 includes an external controller 500 provided with a human detection sensor 5001. In a case where the multi-display device M6 is configured by arrangement of large liquid crystal displays, the multi-display device M6 may be made larger than an observer. From the standpoint of the observer, a place that provides easy visual recognition (place that is easily viewed) and a place that does not provide easy visual recognition (place that is not easily viewed) are changed according to observation positions.

Figure 20A:
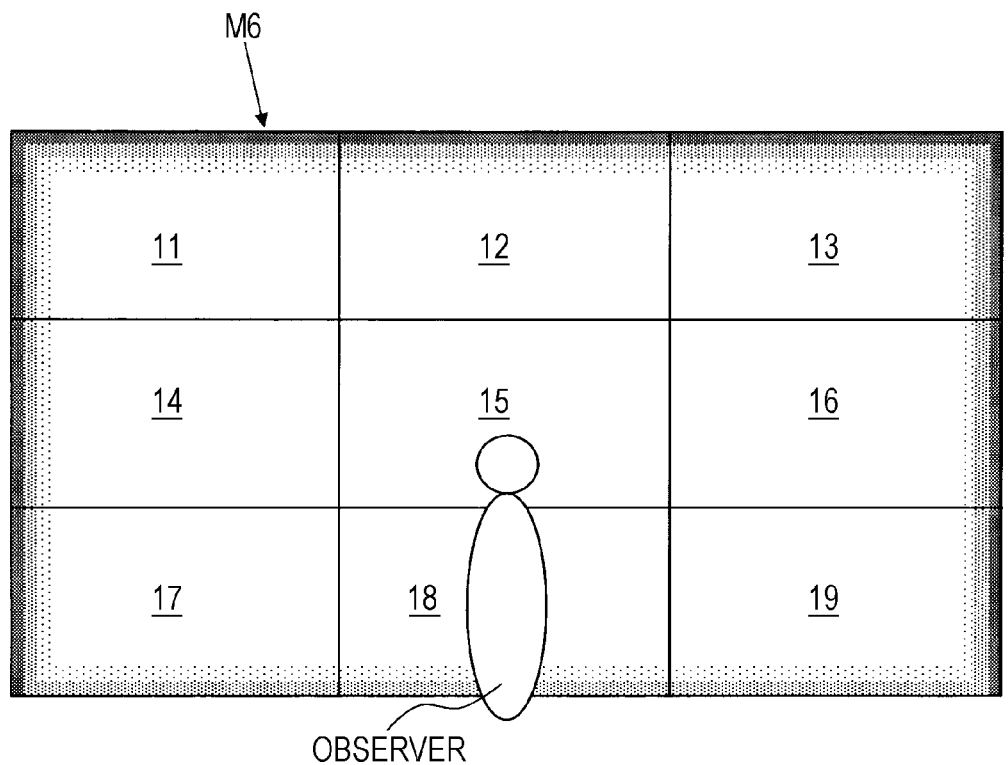
FIG. 20A is a diagram illustrating luminance distribution of planar light in the multi-display device shown in FIG. 19.
Figure 20B:
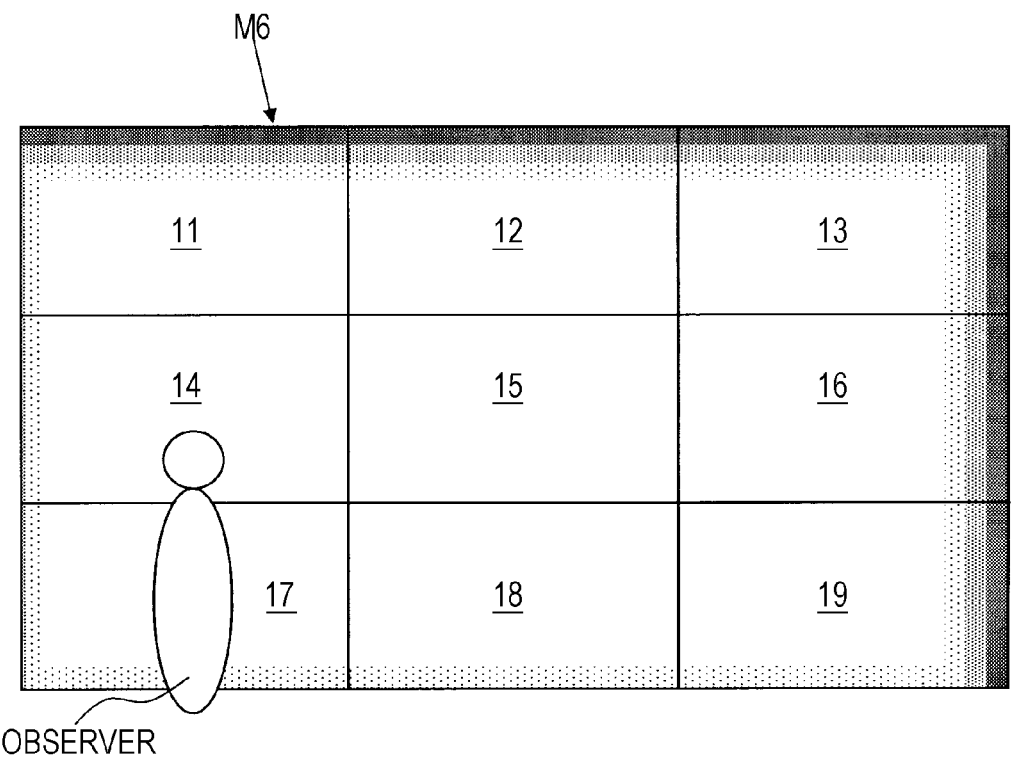
FIG. 20B is a diagram illustrating luminance distribution of planar light in the multi-display device shown in FIG. 19.

As shown in FIG. 20A, in a case where the observer is positioned at the center of the multi-display device M6, the peripheral part of upper, left and right sides are not easily viewed, and thus, luminance at the peripheral part may be low. On the other hand, since the height of the observer's eyes is inclined to a lower side of the multi-display device M6, the lower side is easily viewed compared with the above-described three sides. Thus, the multi-display device M6 detects the position of the observer by the human detection sensor 5001, and selects or generates a table such that the luminance is high at the place that is easily viewed and is low at the place that is not easily viewed, on the basis of the detection result. The luminance correcting section 56 corrects PWM values with reference to the table.

As shown in FIG. 20A, the luminance around the observer is high and the luminance on the upper, left and right sides is low. Further, as shown in FIG. 20B, in a case where the observer shifts to the left, the external controller 500 selects or generates a table such that the luminance on the left side of the multi-display device M6 is high and the luminance on the upper right side thereof is low.

By performing the luminance correction as described above, it is possible to achieve luminance distribution in consideration of the perceptual features of human vision regardless of the position of the observer, and thus, it is possible to reduce energy consumption while suppressing the observer from recognizing luminance unevenness. The human sensor may be provided for use in each liquid crystal display instead of the external controller 500. In this case, the detection result in the human sensor of each liquid crystal display is collected in the external controller, and the external controller 500 performs general determination to recognize the position of the observer, to thereby make it possible to perform recognition with high accuracy.

Further, a configuration may be used in which the external controller 500 generates or selects a multi-luminance correction filter group, instead of the multi-luminance correction filter group. The external controller 500 may generate a corresponding table or filter in the LED controller 5 of each liquid crystal display.

Eighth Embodiment

Figure 21:
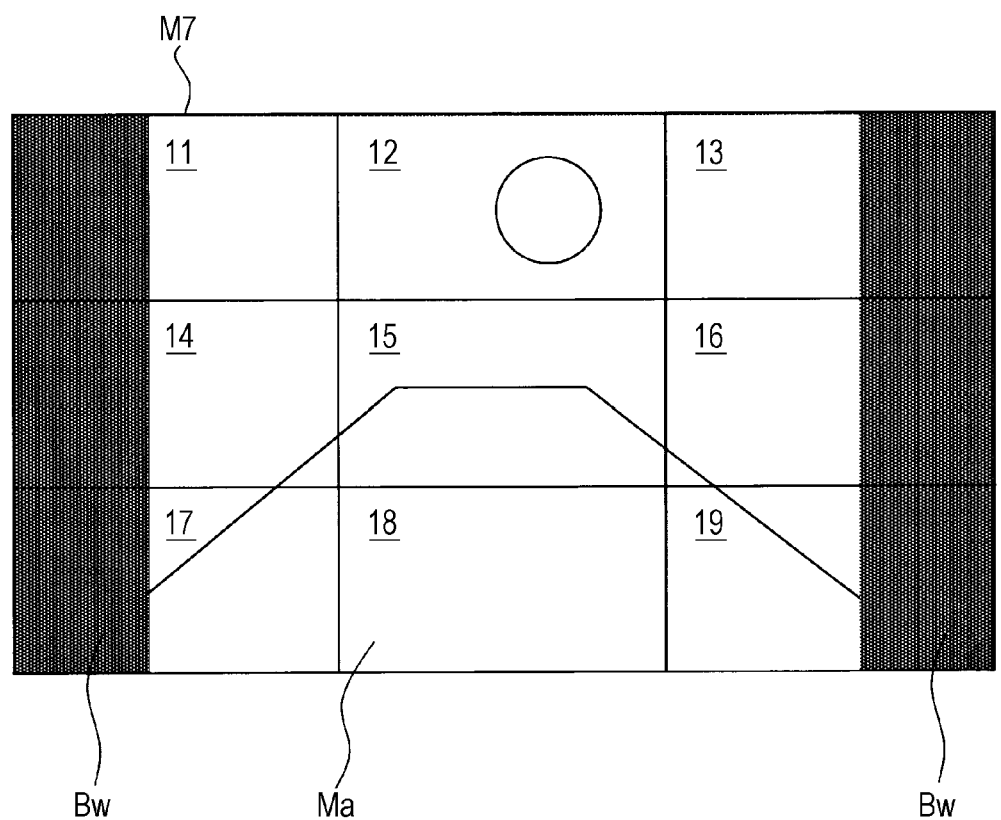
FIG. 21 is a schematic diagram illustrating an image display in still another example of a multi-display device according to an embodiment of the present invention.
Figure 22:
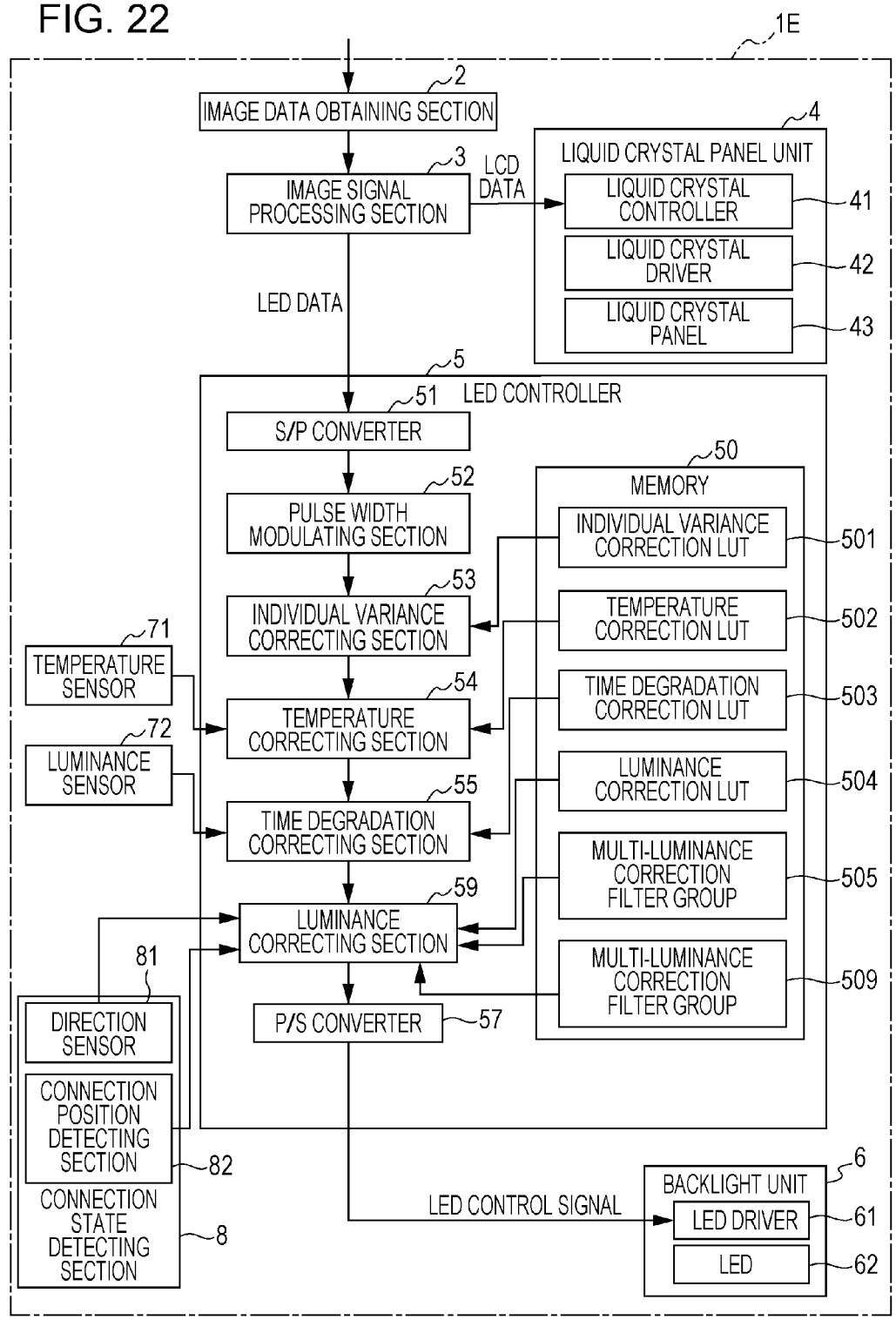
FIG. 22 is a block diagram illustrating a configuration of a liquid crystal display that constitutes the multi-display device in FIG. 21.

Still another example of a multi-display device according to an embodiment of the present invention will be described with reference to the accompanying drawings. FIG. 21 is a schematic diagram illustrating an image display in still another example of a multi-display device according to an embodiment of the present invention, FIG. 22 is a block diagram illustrating a configuration of a liquid crystal display that constitutes the multi-display device in FIG. 21, and FIG. 23 is a diagram illustrating an example of a table provided in a multi-luminance correction filter group provided in the liquid crystal display shown in FIG. 22.

A multi-display device M7 may display an image of 16:9, but in the multi-display device M7 shown in FIG. 21, an existing image of 4:3 is displayed. Here, a method of horizontally extending the image of 4:3 for display may be used, but this method causes degradation of display quality. Thus, as shown in FIG. 21, in many cases, a black band part (Bw) is displayed on left and right sides.

In a case where image data with a shape (aspect ratio) different from that of the multi-display device M7 is input as described above, the image signal processing section 3 transmits image information (here, information indicating that the black band part is present) and LED data to the LED controller 5. As shown in FIG. 22, in a liquid crystal display 1E, the image information input to the LED controller 5 is transmitted to a luminance correcting section 59. The luminance correcting section 59 selects a multi-luminance correction filter group 509 for luminance correction from the memory 50 on the basis of the image information, and corrects PWM values on the basis of the multi-luminance correction filter group.

A table 5091 included in the multi-luminance correction filter group 509 is as shown in FIG. 23. The table shown in FIG. 23 corresponds to a table for correction of PWM values of the upper left liquid crystal display 11 of the multi-display device M7 shown in FIG. 21. The black band part Bw may be displayed as a distinctly black color by lighting off the LED 62. Thus, it is possible to further improve the display quality. To this end, the table 5091 employs 0 as a correction factor of the black band part Bw. Further, in a region Ma in which an image is displayed, correction factors are set so that the luminance at the peripheral part is low. The multi-luminance correction filter group 509 includes tables in consideration of the black band parts Bw corresponding to the other liquid crystal displays 12 to 19.

Further, in the liquid crystal display, for example, the multi-luminance correction filter group 505 as shown in the first embodiment is also provided in the memory 50, and when the luminance correcting section 59 obtains information indicating that the image including the black band part Bw is present, the multi-luminance correction filter group 509 may be selected.

Since the luminance of the image part except for the black band part Bw is corrected as described above, it is possible to use planar light with luminance distribution in consideration of the perceptual features of human vision, and it is possible to reduce power consumption while suppressing an observer from recognizing luminance unevenness. Further, a character, an image or the like may be displayed in the black band part in data broadcasting or the like. In this case, it is possible to refer to a multi-luminance correction filter group provided with a table in which the correction factor at the black band part is not zero. Further, in many cases, it is easy to set the black band part to have low luminance, and thus, the luminance correcting section 59 may correct the PWM values at the black band part using predetermined low correction factors (for example, 128 or the like in a table of 8 bits).

Further, the multi-luminance correction filter group may configure a filter instead of a table. Further, in the present embodiment, the multi-luminance correction filter group 509 is stored in the memory in advance, but the present embodiment is not limited thereto. For example, a configuration that is provided with a calculating section that generates a table or a filter corresponding to the LED controller 5 of each liquid crystal display or an external controller may be used.

In the above-described respective embodiments, in order to determine the supply current to the LED 62, the pulse width modulation method for changing PWM values is used, but the current value may be directly corrected. In this case, a current value setting section that sets the value of the supply current to the LED 62 may be disposed instead of the pulse width modulating section, to correct the current value by the individual variance correcting section, temperature correcting section, time degradation correcting section and luminance correcting section.

Further, in the above-described respective embodiments, the PWM value of the LED 62 is corrected in association with the area 600, but in a case where the LED 62 includes a red (R) LED chip, a green (G) LED chip and a blue (B) LED chip, for example, a PWM value for each chip may be corrected. When the correction is performed for each chip as described above, a correction table for each chip may be provided. In a case where the PWM value for each chip is corrected in this way, the correction process becomes complicated, but it is possible to achieve tone correction and to perform high quality display.

In the above-described respective embodiments, the connection between the liquid crystal displays that constitute the multi-display devices and the connection between the liquid crystal displays and the external controller (the image distributer 100, the external controller 200, 300 or 400) may be a wired connection or a wireless connection. In the case of the wired connection, the influence of neighboring radio waves is small. Further, in the case of the wireless connection, wires may be omitted, thereby making it possible to easily configure the multi-display device.

Hereinbefore, the embodiments of the present invention have been described, but the present invention is not limited to the content thereof. Further, the embodiments of the present invention may be variously modified in a range without departing from the spirit of the present invention.

INDUSTRIAL APPLICABILITY

The multi-display device according to the present invention may be disposed in a wide open place where many observers are gathered, such as a station, an event site or a stadium, and may be used as an image display device for transmitting information (for displaying an image) to many observers.

REFERENCE SIGNS LIST 100 image distributor
11 to 19 liquid crystal display
101 to 109 liquid crystal display
M1 to M7 multi-display device
2 image data obtaining section
3 image signal processing section
4 liquid crystal panel unit
41 liquid crystal controller
42 liquid crystal panel
43 liquid crystal driver
5 LED controller
51 S/P converter
52 pulse width modulating section
53 individual variance correcting section
54 temperature correcting section
55 time degradation correcting section
56 luminance correcting section
57 P/S converter
58, 59 luminance correcting section
50 memory
501 individual variance correction LUT
502 temperature correction LUT
503 time degradation correction LUT
504 luminance correction LUT
505 multi-luminance correction filter group
506 correction filter
507 multi-luminance correction filter group
6 backlight unit
61 LED driver
62 LED
63 LED mounted substrate

The invention claimed is:

1. A multi-display device comprising:
a plurality of image display devices configured to display a continuous image, each of the image display devices comprising:
an image-display-light emitting backlight configured to cause a light emitting element arranged in each of a plurality of areas to emit light to form planar light;
a light emission controller configured or programmed to generate emission luminance data, for each area, to drive the light emitting element; and
a memory of the light emission controller which is configured to store a multi-luminance correction filter group including a correction data table for correction of the emission luminance data of each of the plurality of image display devices, wherein
the light emission controller is configured or programmed to correct the emission luminance data with reference to the correction data table selected from the multi-luminance correction filter group on the basis of connection information on the image display device.

2. The multi-display device according to claim 1, wherein the connection information at least includes information about any one of the number of connections, an installation direction, and a connection position.

3. The multi-display device according to claim 1, wherein the light emission controller corrects the emission luminance data so that the planar light emitted from the image-display-light emitting backlight included in each of the image display devices is controlled to have a decreased luminance in a peripheral portion of an image display section of the multi-display device.

4. The multi-display device according to claim 1, wherein the light emission luminance correcting controller corrects the emission luminance data so that the planar light has a uniform luminance distribution and thereafter performs luminance correction on the basis of the connection information about the image display device.

5. The multi-display device according to claim 1, wherein the image-display-light emitting backlight is configured to generate planar light with a non-uniform luminance distribution.

6. The multi-display device according to claim 1, wherein the memory includes luminance inclination information along at least two directions of the multi-display device, and
the light emission controller is configured or programmed to generate the multi-luminance correction filter group corresponding to each of the image display devices on the basis of the luminance inclination information.

7. The multi-display device according to claim 1, wherein each of the image display devices includes connection state detector that includes a sensor configured to detect an installation direction and/or a connection position detector configured to detect a connection position of the image display device in the multi-display device.

8. The multi-display device according to claim 1, wherein the multi-display device includes an external controller that is connected to all of the plurality of image display devices and configured or programmed to transmit the connection information to each of the image display devices.

9. The multi-display device according to claim 1, wherein the multi-display device includes an external controller that is connected to all of the plurality of image display devices and configured or programmed to transmit, to each of the image display devices, information to select the corresponding correction data table from the multi-luminance correction filter group on the basis of the connection information.

10. The multi-display device according to claim 1, wherein the multi-display device includes a detecting sensor configured to detect the position of an observer,
the multi-luminance correction filter group includes a correction data table to correct the emission luminance data of each of the image display devices in accordance with the position of the observer, and
the corresponding correction data table is selected on the basis of the connection information and the position of the observer.

11. The multi-display device according to claim 1, wherein the multi-luminance correction filter group includes the correction data table that matches with image data, and
wherein the light emission controller is configured or programmed to receive the emission luminance data and information indicating a characteristic of an image to be displayed and refers to the correction data table on the basis of the connection information and the information indicating the characteristic of the image.

12. An image display device that constitutes the multi-display device according to claim 1.

13. A multi-display device comprising:
a plurality of image display devices configured to display a continuous image, each of the image display devices comprising:
an image-display-light emitting backlight configured to cause a light emitting element arranged in each of a plurality of areas to emit light to form planar light;
a light emission controller configured or programmed to generate emission luminance data, for each area, to drive the light emitting element; and
a memory which is configured to store a multi-luminance correction filter group including a correction data table for correction of the emission luminance data of each of the plurality of image display devices, wherein
the light emission controller is configured or programmed to correct the emission luminance data with reference to the correction data table selected from the multi-luminance correction filter group on the basis of connection information on the image display device, and
the multi-display device further includes an external controller that is connected to all of the plurality of image display devices, that includes therein the memory including the correction data table for correction of the emission luminance data, and that is configured or programmed to transmit, to each of the image display devices, the correction data table selected for each of the image display devices from the multi-luminance correction filter group on the basis of the connection information.

14. The multi-display device according to claim 13, wherein the memory stores luminance inclination information along at least two directions of the multi-display device, and
the external controller is configured or programmed to generate the multi-luminance correction filter group corresponding to each of the image display devices on the basis of the luminance inclination information.

* * * * *